United States Patent
Yoshida

(10) Patent No.: US 9,325,880 B2
(45) Date of Patent: Apr. 26, 2016

(54) IMAGE PROCESSING APPARATUS ADJUSTING IMAGE DATA INCLUDING A PLURALITY OF SETS OF COMPONENT IMAGE DATA

(71) Applicant: BROTHER KOGYO KABUSHIKI KAISHA, Nagoya-shi, Aichi-ken (JP)

(72) Inventor: Yasunari Yoshida, Aichi-ken (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/806,916

(22) Filed: Jul. 23, 2015

(65) Prior Publication Data

US 2016/0037018 A1    Feb. 4, 2016

(30) Foreign Application Priority Data

Jul. 30, 2014  (JP) .................................. 2014-155587

(51) Int. Cl.
| | |
|---|---|
| G06K 15/02 | (2006.01) |
| H04N 1/407 | (2006.01) |
| G06K 15/10 | (2006.01) |
| H04N 1/40 | (2006.01) |

(52) U.S. Cl.
CPC .............. H04N 1/407 (2013.01); G06K 15/102 (2013.01); G06K 15/1876 (2013.01); H04N 1/40068 (2013.01)

(58) Field of Classification Search
USPC ........................................................ 358/1.2
See application file for complete search history.

(56) References Cited

U.S. PATENT DOCUMENTS

| | | | | |
|---|---|---|---|---|
| 7,486,413 | B2 * | 2/2009 | Eliav ...................... | H04N 1/508 358/1.2 |
| 8,340,396 | B2 * | 12/2012 | Yao .......................... | H04N 1/58 358/1.8 |
| 2008/0266608 | A1 * | 10/2008 | Yamazaki .................. | B41J 2/15 358/3.06 |
| 2011/0222076 | A1 | 9/2011 | Kuno | |
| 2011/0222083 | A1 | 9/2011 | Kuno | |
| 2011/0238659 | A1 * | 9/2011 | Chittar ................ | G06F 17/3025 707/724 |
| 2013/0259363 | A1 * | 10/2013 | Ozawa ................. | G06K 9/4652 382/164 |
| 2013/0321504 | A1 | 12/2013 | Hasegawa | |

FOREIGN PATENT DOCUMENTS

| | | |
|---|---|---|
| JP | 10-337934 A | 12/1998 |
| JP | 2011-193229 A | 9/2011 |
| JP | 2011-193231 A | 9/2011 |
| JP | 2013-244703 A | 12/2013 |

* cited by examiner

*Primary Examiner* — Allen H Nguyen
(74) *Attorney, Agent, or Firm* — Merchant & Gould P.C.

(57) ABSTRACT

An image processing apparatus adjusts first and second component images. The adjusted first component image has a pixel count in a prescribed direction determinative of a first resolution. The adjusted second component image has a pixel count in the prescribed direction determinative of a second resolution lower than the first resolution. Each adjusted component image is generated by: selecting a target pixel; acquiring gradation values of correspondence pixels in the pre-adjusted component image; and determining a gradation value of the target pixel based on gradation values of the correspondence pixels. The correspondence pixels are overlapped by the target pixel when the pre-adjusted component images are shifted in the prescribed direction relative to the adjusted component images and superimposed in the adjusted component image.

10 Claims, 12 Drawing Sheets

IMAGE PROCESSING APPARATUS ADJUSTING IMAGE DATA INCLUDING A PLURALITY OF SETS OF COMPONENT IMAGE DATA

CROSS REFERENCE TO RELATED APPLICATION

This application claims priority from Japanese Patent Application No. 2014-155587 filed Jul. 30, 2014. The entire content of the priority application is incorporated herein by reference.

TECHNICAL FIELD

The present disclosure relates to an image processing apparatus.

BACKGROUND

A conventional inkjet printer known in the art includes a print head having a plurality of nozzles for ejecting black (K) ink that are arranged at a first nozzle pitch along a specific direction, and a plurality of nozzles for ejecting ink in each of the chromatic colors cyan (C), magenta (M), and yellow (Y), each being arranged at a second nozzle pitch greater than the first nozzle pitch along the same specific direction. This print head can print gray images formed using only black ink at high speed, for example, and can reduce the required number of parts and manufacturing man-hours by decreasing the number of nozzles in the print head.

SUMMARY

However, the proposal for the above conventional print head does not describe any changes in resolution in the specific direction, i.e., any changes to the number of pixels (pixel count) used in the specific direction, between the chromatic color component images (also called "layers") and the black component image. If the number of pixels in the specific direction were to be modified in image data for one component image among the data for the plurality of component images, there could be a drop in the quality of the image rendered by the image data, such as an unnatural appearance in edge parts of the image.

In view of the foregoing, it is an object of the present disclosure to improve the quality of an image rendered by image data that includes data for a plurality of component images having different numbers of pixels in the specific direction.

In order to attain the above and other objects, the disclosure provides an image processing apparatus including a controller. The controller is configured to perform: acquiring image data representing an image and including first component image data and second component image data, the first component image data representing a first component image including a plurality of pixels each having a gradation value of a first color component, the second component image data representing a second component image including a plurality of pixels each having a gradation value of a second color component; adjusting the first component image data to generate adjusted first component image data, the adjusted first component image data representing an adjusted first component image including a plurality of pixels each having a gradation value of the first color component, a pixel count in a first direction of the adjusted first component image being determinative of a first resolution; adjusting the second component image data to generate adjusted second component image data, the adjusted second component image data representing an adjusted second component image including a plurality of pixels each having a gradation value of the second color component, a pixel count in the first direction of the adjusted second component image being determinative of a second resolution lower than the first resolution; and generating adjusted image data based on the adjusted first component image data and adjusted second component image data. The adjusted first component image data is generated by: selecting a first target pixel from the plurality of pixels in the adjusted first component image; acquiring gradation values of first correspondence pixels, the first correspondence pixels being at least two of the plurality of pixels in the first component image that are overlapped by the first target pixel when the first component image is shifted a first distance in the first direction relative to the adjusted first component image and superimposed in the adjusted first component image under the following assumed conditions (a)-(d); and determining a gradation value of the first target pixel on a basis of gradation values of the first correspondence pixels. The assumed condition (a) is a condition that a dimension of the first component image in the first direction is identical to a dimension of the adjusted first component image in the first direction. The assumed condition (b) is a condition that a dimension of the first component image in the second direction is identical to a dimension of the adjusted first component image in the second direction. The assumed condition (c) is a condition that the plurality of pixels in the first component image is arranged in a grid form, each pixel in the first component image having a first height in the first direction and a first width in the second direction, the first height being determined on a basis of a pixel count in the first direction of the first component image, the first width being determined on a basis of a pixel count in the second direction of the first component image. The assumed condition (d) is a condition that the plurality of pixels in the adjusted first component image is arranged in a grid form, each pixel in the adjusted first component image having a second height in the first direction and a second width in the second direction, the second height being determined on a basis of the pixel count in the first direction of the adjusted first component image, the second width being determined on a basis of a pixel count in the second direction of the adjusted first component image. The adjusted second component image data is generated by: selecting a second target pixel from the plurality of pixels in the adjusted second component image; acquiring gradation values of second correspondence pixels, the second correspondence pixels being at least two of the plurality of pixels in the second component image that are overlapped by the second target pixel when the second component image is shifted a second distance in the first direction relative to the adjusted second component image and superimposed in the adjusted second component image under the following assumed conditions (e)-(h); and determining a gradation value of the second target pixel on a basis of gradation values of the second correspondence pixels. The assumed condition (e) is a condition that a dimension of the second component image in the first direction is identical to a dimension of the adjusted second component image in the first direction. The assumed condition (f) is a condition that a dimension of the second component image in the second direction is identical to a dimension of the adjusted second component image in the second direction. The assumed condition (g) is a condition that the plurality of pixels in the second component image is arranged in a grid form, each pixel in the second component image having a third height in the first direction and a third width in the second direction, the third height being determined on a basis of a pixel count in the first direction of the second component image, the third width being determined on a basis of a pixel count in the second direction of the second component image. The assumed condition (h) is a condition that the plurality of pixels in the adjusted second component image is arranged in a grid form, each pixel in the adjusted second component image having a fourth height in the first direction and a fourth width in the second direction, the fourth height being determined on a basis of the pixel count in the first direction of the adjusted second component image, the fourth width being determined on a basis of a pixel count in the second direction of the adjusted second component image.

According to another aspect, the disclosure provides a non-transitory computer readable storage medium storing a set of program instructions executed by a computer. The program instructions include: acquiring image data representing an image and including first component image data and second component image data, the first component image data representing a first component image including a plurality of pixels each having a gradation value of a first color component, the second component image data representing a second component image including a plurality of pixels each having a gradation value of a second color component; adjusting the first component image data to generate adjusted first component image data, the adjusted first component image data representing an adjusted first component image including a plurality of pixels each having a gradation value of the first color component, a pixel count in a first direction of the adjusted first component image being determinative of a first resolution; adjusting the second component image data to generate adjusted second component image data, the adjusted second component image data representing an adjusted second component image including a plurality of pixels each having a gradation value of the second color component, a pixel count in the first direction of the adjusted second component image being determinative of a second resolution lower than the first resolution; and generating adjusted image data based on the adjusted first component image data and adjusted second component image data. The adjusted first component image data is generated by: selecting a first target pixel from the plurality of pixels in the adjusted first component image; acquiring gradation values of first correspondence pixels, the first correspondence pixels being at least two of the plurality of pixels in the first component image that are overlapped by the first target pixel when the first component image is shifted a first distance in the first direction relative to the adjusted first component image and superimposed in the adjusted first component image under the assumed conditions (a)-(d) described above; and determining a gradation value of the first target pixel on a basis of gradation values of the first correspondence pixels. The adjusted second component image data is generated by: selecting a second target pixel from the plurality of pixels in the adjusted second component image; acquiring gradation values of second correspondence pixels, the second correspondence pixels being at least two of the plurality of pixels in the second component image that are overlapped by the second target pixel when the second component image is shifted a second distance in the first direction relative to the adjusted second component image and superimposed in the adjusted second component image under the following assumed conditions (e)-(h) described above; and determining a gradation value of the second target pixel on a basis of gradation values of the second correspondence pixels.

BRIEF DESCRIPTION OF THE DRAWINGS

The particular features and advantages of the invention as well as other objects will become apparent from the following description taken in connection with the accompanying drawings, in which.

DETAILED DESCRIPTION

A. Embodiments

A-1. Structure of a Printer 100

Figure 1:
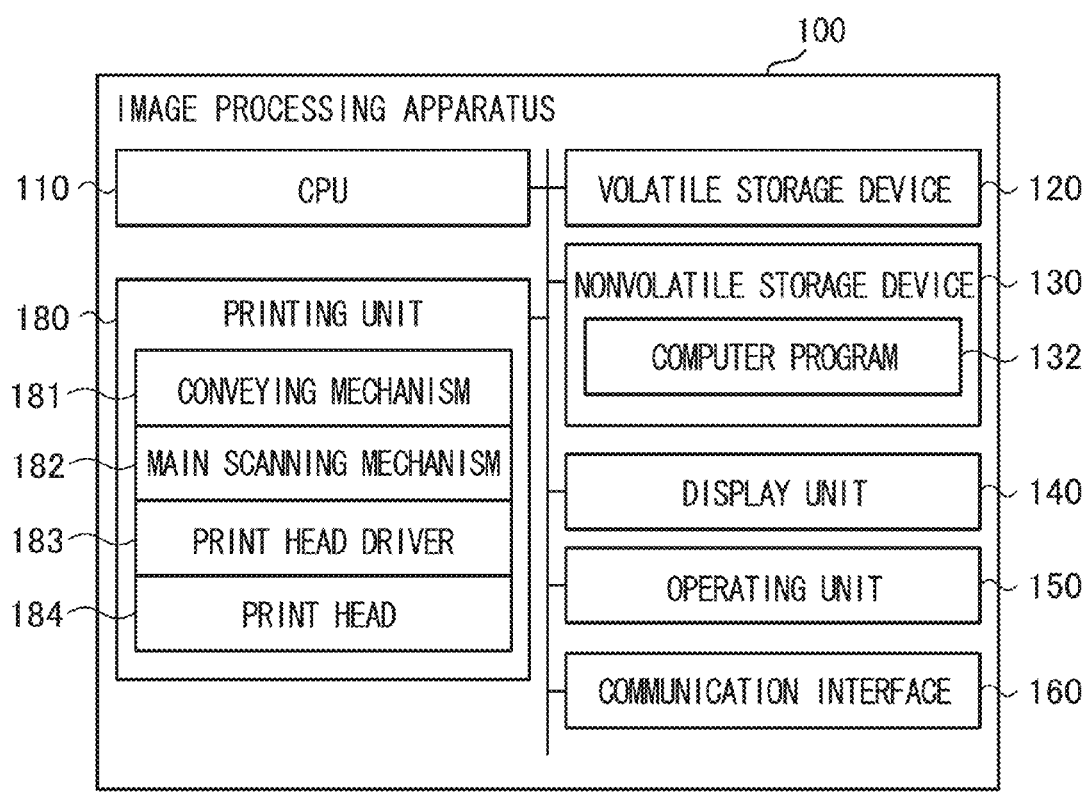
FIG. 1 is a block diagram showing the overall structure of an image processing apparatus according to a first embodiment.

FIG. 1 is a block diagram showing the overall structure of a printer 100 according to a first embodiment of the disclosure. The printer 100 serves an example of an image processing apparatus and includes a CPU 110 serving as a controller that controls the printer 100; a volatile storage device 120, such as DRAM; a nonvolatile storage device 130, such as flash memory; a display unit 140, such as a liquid crystal display; an operating unit 150 including a touchscreen, buttons, and the like; a communication interface 160; and a printing unit 180.

The nonvolatile storage device 130 stores a computer program 132. By executing the computer program 132, the CPU 110 implements various functions controlling the printer 100, such as a function for executing a printing process described later as an image-processing unit. The computer program 132 is pre-stored in the nonvolatile storage device 130 prior to shipping the printer 100, for example. Alternatively, the computer program 132 may be provided in a recorded format on a CD-ROM or the like, or made available for download from a server.

The volatile storage device 120 is used as a buffer area for temporarily storing various intermediate data used when the CPU 110 executes programs such as the computer program 132, for example.

The display unit 140 is a device that displays images and is used for displaying various user interface (UI) windows, for example. The operating unit 150 is a device operated by the user and functions to receive commands from the user related to a printing process described later. The communication interface 160 may be a wired or wireless interface for connecting the printer 100 to a network.

The printing unit 180 is an inkjet-type printing mechanism configured to print by ejecting ink in the colors cyan (C), magenta (M), yellow (Y), and black (K) in order to form dots on paper. The printing unit 180 includes a conveying mechanism 181, a main scanning mechanism 182, a print head driver 183, and a print head 184.

The conveying mechanism 181 is driven to convey sheets of paper in a conveying direction by the drive force of a conveying motor (not shown). The main scanning mechanism 182 is driven to reciprocate the print head 184 in a main scanning direction (to perform a main scan) by the drive force of a main scanning motor (not shown). As the print head 184 is reciprocated in the main scanning direction, the print head driver 183 drives the print head 184 according to print data in order to eject ink droplets from the print head 184 onto a sheet of paper conveyed by the conveying mechanism 181, forming dots on the paper.

Figure 2:
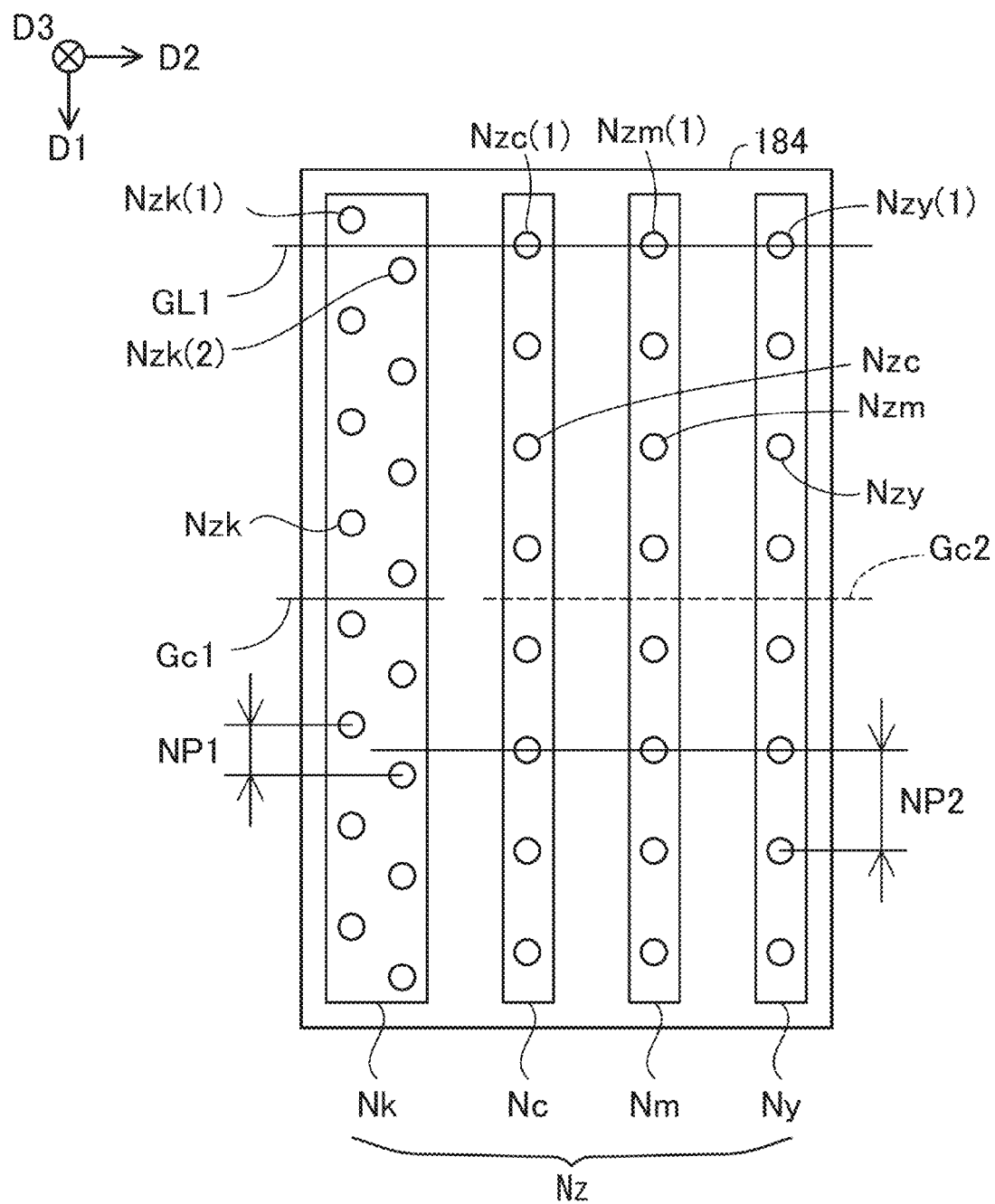
FIG. 2 shows an example of a layout of nozzles of a print head in the first embodiment.

FIG. 2 depicts the layout of nozzles Nz provided in the print head 184. As indicated by arrows in FIG. 2, a first direction D1 is the direction in which the print head 184 moves in relation to a sheet of paper being conveyed and, hence, is the direction opposite the conveying direction for paper (hereinafter called the "sub scanning direction"); a second direction D2 orthogonal to the first direction D1 and a direction opposite to the second direction D2 are the main scanning directions; and a third direction D3 is a direction orthogonal to both the first direction D1 and the second direction D2 and directed from the print head 184 to a sheet of paper positioned opposite the print head 184 during a printing operation. A plurality of the nozzles Nz is formed in the surface of the print head confronting the paper in the third direction D3 (hereinafter called the "nozzle surface"). FIG. 2 shows the arrangement of nozzles with the nozzle surface of the print head 184 in phantom viewed from the side downstream in a direction opposite to the third direction D3.

The print head 184 has a black nozzle group Nk for ejecting black ink, a cyan nozzle group Nc for ejecting cyan ink, a magenta nozzle group Nm for ejecting magenta ink, and a yellow nozzle group Ny for ejecting yellow ink. These nozzle groups Nk, Nc, Nm, and Ny are individually aligned in the first direction D1 and juxtaposed with each other in the second direction D2. The black ink is an example of first colorant. The cyan, magenta, and yellow inks are an example of second colorant.

The black nozzle group Nk includes (2×J) (where J is an integer of 2 or greater and is 500 in the first embodiment) black nozzles Nzk arrayed in the first direction D1 in a staggered arrangement. However, for simplicity J is set to 8 in FIG. 2. The (2×J) black nozzles Nzk are arranged in different positions from each other in the first direction D1. As shown in FIG. 2, the distance between neighboring black nozzles Nzk in the first direction D1 is a nozzle pitch NP1. In the first embodiment, the nozzle pitch NP1 is 1/600 inches, i.e., a nozzle pitch corresponding to 600 dots per inch (dpi).

The cyan nozzle group Nc includes J cyan nozzles Nzc arranged in a straight line parallel to the first direction D1. The J cyan nozzles Nzc are arranged at different positions in the first direction D1. As shown in FIG. 2, the distance between neighboring cyan nozzles Nzc in the first direction D1 is a nozzle pitch NP2. In the first embodiment, the nozzle pitch NP2 is 1/300 inches, i.e., a nozzle pitch equivalent to 300 dpi.

As described above, the nozzle pitch NP2 for the chromatic nozzle groups Nc, Nm, and Ny is two times the length of the nozzle pitch NP1 for nozzles in the black nozzle group Nk in the first embodiment (NP2=2×NP1). Further, the number J of nozzles in each of the chromatic nozzle groups Nc, Nm, and Ny is half the number (2×J) of nozzles in the black nozzle group Nk. Thus, the nozzle length for the respective chromatic nozzle groups Nc, Nm, and Ny (J×NP2) is equivalent to the nozzle length of the black nozzle group Nk (2×J×NP1). This nozzle length for the nozzle groups Nk, Nc, Nm, and Ny will be called a nozzle length NL (NL=J×NP2=2×J×NP1).

As with the cyan nozzle group Nc described above, the magenta nozzle group Nm and yellow nozzle group Ny respectively include J nozzles Nzm and Nzy that are arranged in a straight line parallel to the first direction D1 at the nozzle pitch NP2.

Here, the $i^{th}$ nozzle for cyan, magenta, and yellow counting from the upstream side in the first direction D1 will be expressed as Nzc(i), Nzm(i), and Nzy(i) (where i is a natural number such that $1 \leq i \leq J$). Further, the $i^{th}$ nozzle for black counting from the upstream side in the first direction D1 is expressed by Nzk(i) (where i is a natural number such that $1 \leq i \leq 2J$). The positions of nozzles Nzc(i), Nzm(i), and Nzy(i) relative to the first direction D1 fall between the position of the $(2i-1)^{th}$ black nozzle Nzk(2i-1) counting from the upstream side in the first direction D1 and the position of the $(2i)^{th}$ black nozzle Nzk(2i) relative to the first direction D1. In other words, each of the nozzles Nzc(i), Nzm(i), and Nzy(i) is centered between the $(2i-1)^{th}$ black nozzle Nzk(2i-1) and the $(2i^{th}$ black nozzle Nzk(2i) relative to the first direction D1. In the example of FIG. 2, nozzles Nzc(1), Nzm(1), and Nzy(1) fall on a centerline GL1 between the two black nozzles Nzk (1) and Nzk(2) in the first direction D1.

As a result, a center of gravity Gc2 of the J cyan nozzles Nzc relative to the first direction D1 is aligned with a center of gravity Gc1 of the (2×J) black nozzles Nzk relative to the first direction D1. Similarly, the center of gravity Gc2 in the first direction D1 for each of the J magenta and yellow nozzles Nzm and Nzy is aligned with the center of gravity Gc1 in the first direction D1 of the (2×J) black nozzles Nzk.

A-2. Printing Method

Figure 3:
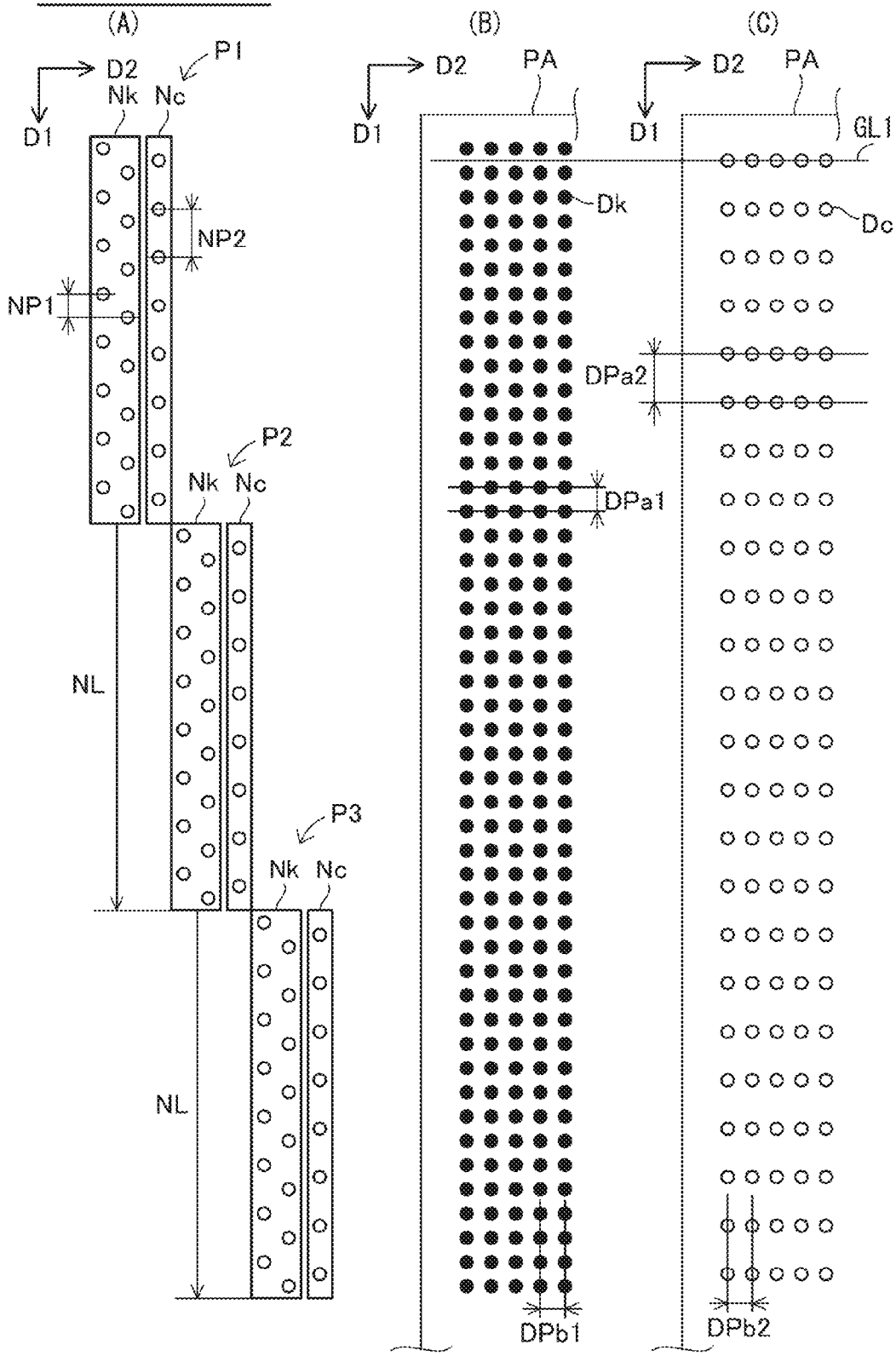
FIG. 3 is an explanatory diagram illustrating a printing method of the first embodiment.

Next, a printing method executed by the CPU 110 of the printer 100 according to the first embodiment using the printing unit 180 will be described. FIG. 3 is an explanatory diagram illustrating the printing method of the first embodiment.

The CPU 110 is configured to perform printing by controlling the conveying mechanism 181, the main scanning mechanism 182, and the print head driver 183 to execute a unit print and a unit sub scan repeatedly and alternatingly. A "unit print" is a printing operation performed by driving the print head 184 during a main scan while a sheet PA of paper is halted. A single main scan corresponding to a single unit print is called a "pass." A "unit sub scan" is performed by conveying the sheet PA in the conveying direction exactly a prescribed unit feed.

FIG. 3(A) shows the positions of the black nozzle group Nk and cyan nozzle group Nc in the sub scanning direction for each of the first through third passes P1-P3. The positions of the nozzle groups in the sub scanning direction are depicted in FIG. 3(A) as positions relative to the sheet PA (FIGS. 3(B) and 3(C)). The positions of the magenta nozzle group Nm and yellow nozzle group Ny in the sub scanning direction are equivalent to the position of the cyan nozzle group Nc in the sub scanning direction and thus have been omitted from FIG. 3(A).

As shown in FIG. 3(A), the printing method according to the first embodiment is a single-pass printing method in which the prescribed unit feed is equivalent to the nozzle length NL, and a printing area having a width in the first direction D1 equivalent to the nozzle length NL is printed in one pass.

FIG. 3(B) shows dot formation positions Dk for black dots formed by ink ejected from the black nozzle group Nk in passes P1-P3. FIG. 3(C) shows dot formation positions Dc for cyan dots formed by ink ejected from the cyan nozzle group Nc in passes P1-P3. The dot formation positions for magenta dots formed by ink ejected from the magenta nozzle group Nm and yellow dots formed by ink ejected from the yellow nozzle group Ny are equivalent to the dot formation positions for cyan dots.

As shown in FIGS. 3(B) and 3(C), a dot pitch DPa1 in the first direction D1 for black dots is equivalent to the nozzle pitch NP1 of nozzles in the black nozzle group Nk (DPa1=NP1). Further, a dot pitch DPa2 in the first direction D1 for dots in the chromatic colors cyan, magenta, and yellow is equivalent to the nozzle pitch NP2 for nozzles in the respective chromatic nozzle groups Nc, Nm, and Ny (DPa2=NP2). Hence, the dot pitch DPa2 in the first direction D1 for chromatic dots is two times the dot pitch DPa1 in the first direction for black dots (2×DPa1=DPa2). Further, a dot pitch DPb1 in the second direction D2 for black dots is equivalent to a dot pitch DPb2 in the second direction D2 for each of the chromatic dots (DPb1=DPb2).

As described above, the resolution in the first direction D1 (600 dpi in the first embodiment) in the black printed image (hereinafter called the "K-component dot image") in the printing method of the first embodiment is two times the resolution in the first direction D1 (300 dpi in the first embodiment) for the CMY (chromatic color) images (hereinafter called the "chromatic dot images"). Further, the resolution in the second direction D2 in the K-component dot image (600 dpi in the first embodiment) is equivalent to the resolution in the second direction D2 in the chromatic dot images (600 dpi in the first embodiment). The actual printed image is a composite image formed by superposing the K-component dot image with the three chromatic dot images.

A-3. Printing Process

Next, a printing process executed by the CPU 110 for controlling the printing unit 180 to perform a printing operation according to the above printing method will be described. The CPU 110 executes this printing process in response to a print command issued by the user, for example.

Figure 4:
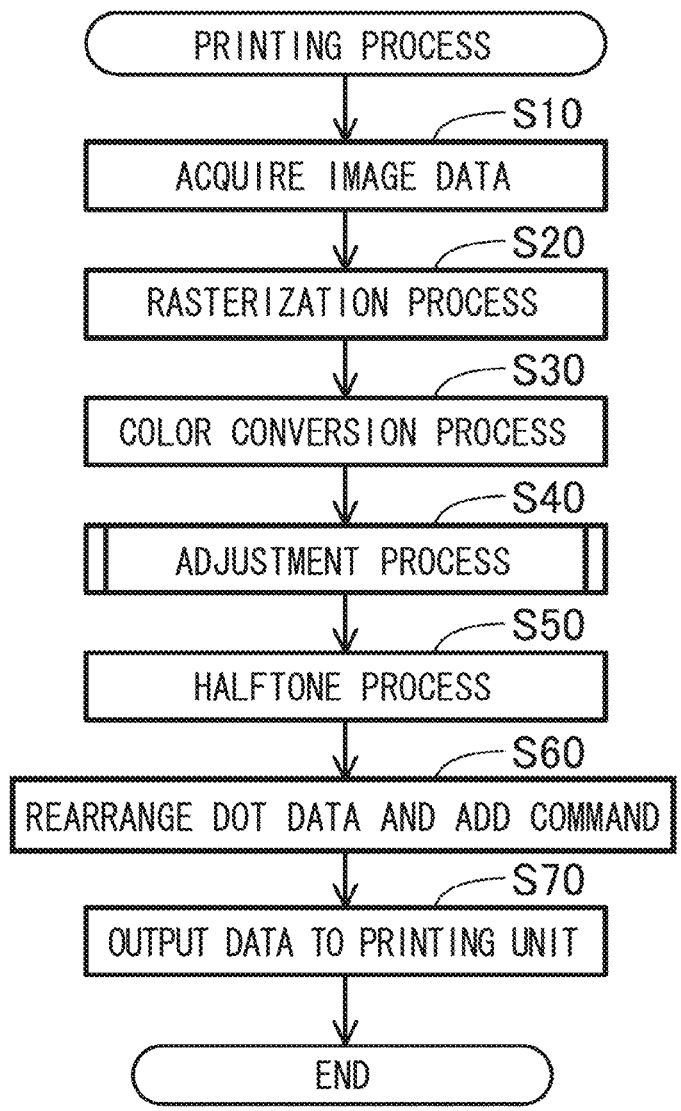
FIG. 4 is a flowchart illustrating steps in a printing process executed by the image processing apparatus according to the first embodiment.

FIG. 4 is a flowchart illustrating steps in the printing process. In S10 the CPU 110 acquires image data to be processed for printing (hereinafter called the "target image data"). The target image data is specified by the user, for example. The target image data is image data with a data format that may differ according to the application program that created the original image data, for example.

In S20 the CPU 110 performs a rasterization process to convert the target image data from its original data format to RGB image data. The RGB image data includes a color value in the RGB color space for each pixel. The color value in the RGB color space further includes a gradation value for each of the R component, G component, and B component. Each gradation value may take on one of 256 gradation values between 0 and 255. In the first embodiment, the target image is printed with its longitudinal direction aligned in the sub scanning direction (i.e., the first direction D1) and its latitudinal direction aligned in the main scanning direction (i.e., the second direction D2). Hence, in the following description, the longitudinal direction of the target image will also be called the first direction D1 and the latitudinal direction the second direction D2. The rasterization process according to the first embodiment generates RGB image data having a pixel number corresponding to the resolution of the K-component dot image described above. Hence, the process generates RGB image data in which the number of pixels (pixel count) in the first direction D1 corresponds to the number of pixels in 600 dpi and the number of pixels (pixel count) in the second direction D2 corresponds to the number of pixels in 600 dpi. That is, the pixel count in the first direction D1 is determinative of 600 dpi.

In S30 the CPU 110 performs a color conversion process on the RGB image data to generate CMYK image data. The color conversion process is performed using a lookup table that defines correlations between color values in the RGB color space and color values in the CMYK color space. Each color value in the CMYK color space includes a gradation value for each of the C component, M component, Y component, and K component, i.e., for each of the four color components corresponding to the four ink colors. Each gradation value can take on one of 256 gradation values between 0 and 255.

The CMYK image data can be expressed as image data including four sets of component image data corresponding to the four color components (CMYK). Each set of component image data include image data having a gradation value of one color component for each pixel. An image represented by the CMYK image data has the same number of pixels as the number of pixels in an image represented by the RGB image data. The number of pixels in each of the four sets of component image data is identical.

In S40 the CPU 110 executes an adjustment process on the CMYK image data and generates adjusted CMYK image data. Each set of component image data for the CMYK colors included in the adjusted CMYK image data will be called a set of adjusted component image data. As will be described later in greater detail, the adjustment process adjusts the number of pixels in the component images to correspond to the resolutions of the CMYK dot images, and adjusts the gradation values for each pixel. As described above, the resolution of the K-component dot image in the first direction D1 (600 dpi) differs from the resolution of the three chromatic dot images in the first direction D1 (300 dpi) according to the printing method of this embodiment. Accordingly, in the adjustment process the CPU 110 adjusts the number of pixels in each of the sets of chromatic component image data in the first direction D1 to half the number of pixels in the set of K-component image data in the first direction D1.

Here, an image whose pixel number in the first direction D1 is E and whose pixel number in the second direction D2 is F will be expressed as an image with pixel number (E×F). Each component image represented by the corresponding set of component image data for C, M, Y, and K, respectively, prior to undergoing the adjustment process (hereinafter called the "pre-adjusted component image data") is an image having pixel number (E1×F1). Further, the adjusted K-component image represented by the adjusted K-component image data is an image with pixel number (E1×F1), while the adjusted chromatic component images represented by the respective sets of adjusted chromatic (CMY) component image data are images with pixel numbers ((E1/2)×F1).

In S50 the CPU 110 executes a halftone process on the adjusted CMYK image data to generate dot data. The halftone process may be executed using any method known in the art, including dithering method, error diffusion method, and error accumulation method. The resulting dot data includes four sets of component dot data representing four dot images in the respective colors C, M, Y, and K. Each of the CMYK sets of component dot data specifies the dot formation state of one of the CMYK colors for each pixel. Each set of component dot data is binary data indicating whether or not dots are to be formed as the dot formation states. As an alternative, each set of component dot data may be configured of four-value data representing whether or not a dot is to be formed and the size of the dot (large, medium, and small, for example) as the dot formation state. Since the number of pixels is not modified in the halftone process, the resulting K-component dot image is an image with pixel number (E1×F1) and the three chromatic-component dot images are images with pixel numbers ((E1/2)×F1).

In S60 the CPU 110 rearranges the dot data in an order that can be used in unit prints and adds various print control codes and data identification codes to generate print data that the printing unit 180 can interpret. In S70 the CPU 110 outputs or supplies the print data generated in S60 to the printing unit 180. As a result, the printing unit 180 prints an image represented by the print data according to the printing method described above.

A-4. Adjustment Process

Figure 5:
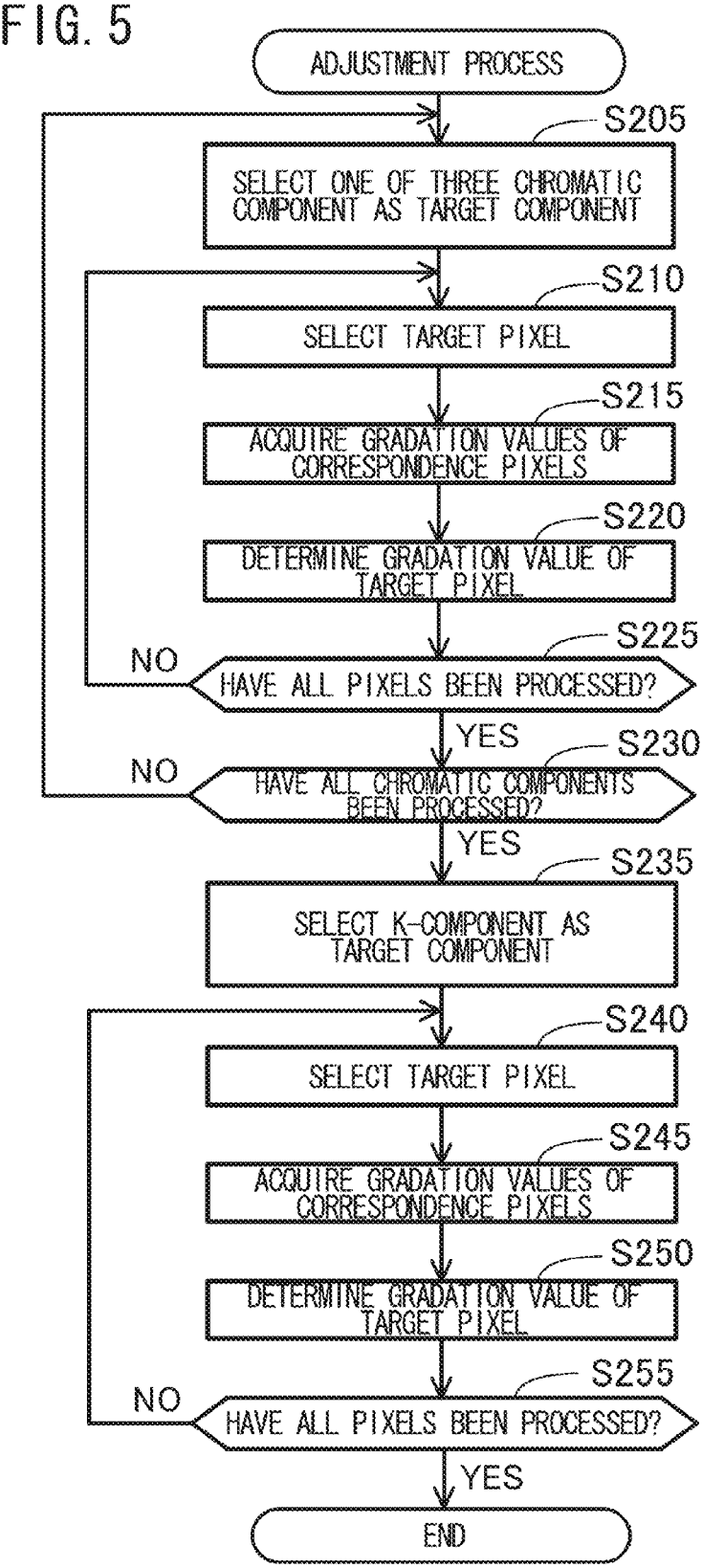
FIG. 5 is a flowchart illustrating steps in an adjustment process of FIG. 4.

Next, the adjustment process in S40 of the printing process described above will be described. FIG. 5 is a flowchart illustrating steps in the adjustment process. In S205 of FIG. 5, the CPU 110 selects one of the three chromatic (CMY) components to be the target component.

In S210 the CPU 110 selects one of the ((E1/2)×F1) pixels whose gradation value has not yet been set from the adjusted component image of the target component to be a target pixel.

Figure 6:
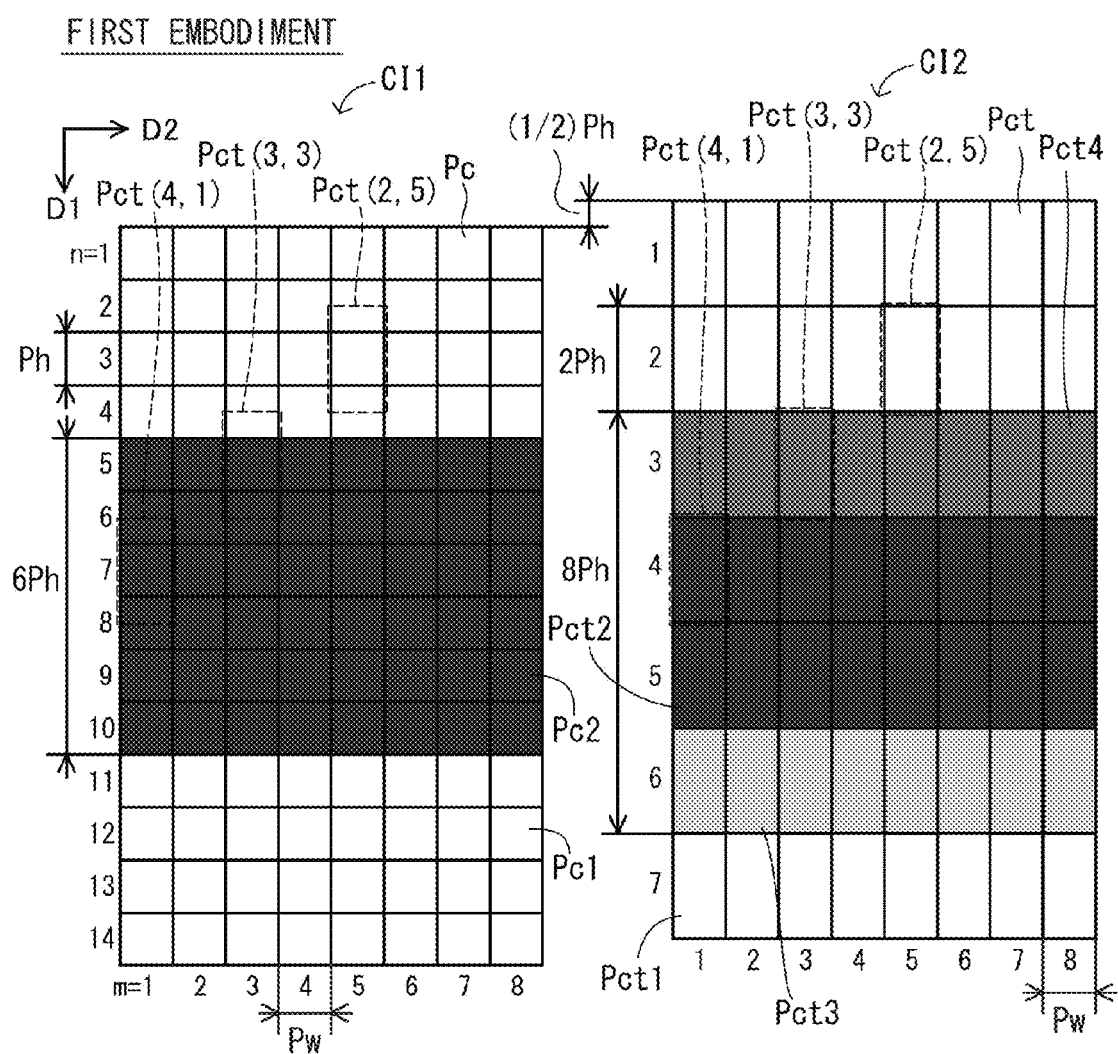
FIG. 6 is an explanatory diagram illustrating a process of generating adjusted component image data for C component in the first embodiment.

In S215 the CPU 110 acquires the gradation values of a plurality of correspondence pixels in the component image prior to the adjustment process that correspond to the target pixel. FIG. 6 is an explanatory diagram illustrating the process of generating adjusted component image data for the C component in the first embodiment. Next, this process will be described with reference to FIG. 6 when the C component is the target component.

The following conditions (1)-(3) will be assumed for the component image and the adjusted component image in the description of the first embodiment.

(1) A component image has (E×F) pixels arranged in a grid form having E pixels in the first direction D1 and F pixels in the second direction D2. Each pixel has a dimension (A/E) in the first direction D1 and dimension (B/F) in the second direction D2.

(2) The dimension of the K-component image in the first direction D1 is identical to the dimension of the adjusted K-component image in the first direction D1 (that is, the dimensions in the first direction D1 are "A"). The dimension of the K-component image in the second direction D2 is identical to the dimension of the adjusted K-component image in the second direction D2 (that is, the dimensions in the second direction D2 are "B").

(3) The dimensions of the chromatic component images in the first direction D1 are identical to the dimensions of the adjusted chromatic component images in the first direction D1 (that is, the dimensions in the first direction D1 are "A"). The dimensions of the chromatic component images in the second direction D2 are identical to the dimensions of the adjusted chromatic component images in the second direction D2 (that is, the dimensions in the second direction D2 are "B").

Assumed condition (1) can be restated as: the pixels in an image divide the image into rectangular areas having the same size. Further, A and B in assumed condition (1) are arbitrary fixed values, while E and F are integers of 2 or greater. In other words, the following conditions (1-a) to (1-d) are assumed.

(1-a) A plurality of pixels in the K-component image is arranged in a grid form, each pixel in the K-component image having a first height in the first direction D1 and a first width in the second direction D2, the first height being determined on a basis of a pixel count in the first direction D1 of the K-component image, the first width being determined on a basis of a pixel count in the second direction D2 of the K-component image.

(1-b) A plurality of pixels in the adjusted K-component image is arranged in a grid form, each pixel in the adjusted K-component image having a second height in the first direction D1 and a second width in the second direction D2, the second height being determined on a basis of the pixel count in the first direction D1 of the adjusted K-component image, the second width being determined on a basis of a pixel count in the second direction D2 of the adjusted K-component image.

(1-c) A plurality of pixels in each chromatic component image is arranged in a grid form, each pixel in the chromatic component image having a third height in the first direction D1 and a third width in the second direction D2, the third height being determined on a basis of a pixel count in the first direction D1 of the chromatic component image, the third width being determined on a basis of a pixel count in the second direction D2 of the chromatic component image.

(1-d) A plurality of pixels in each adjusted chromatic component image is arranged in a grid form, each pixel in the adjusted chromatic component image having a fourth height in the first direction D1 and a fourth width in the second direction D2, the fourth height being determined on a basis of the pixel count in the first direction D1 of the adjusted chromatic component image, the fourth width being determined on a basis of a pixel count in the second direction D2 of the adjusted chromatic component image.

The grid on the left side of FIG. 6 denotes a part of a cyan component image CI1 prior to the adjustment process (hereinafter called the "pre-adjusted C-component image CI1"). The grid on the right side of FIG. 6 denotes a part of an adjusted C-component image CI2. The images CI1 and CI2 are depicted based on the assumed conditions (1)-(3) described above.

As described above, the chromatic component images are images having the pixel number (E1×F1), and adjusted chromatic component images are images having the pixel number ((E1/2)×F1). Accordingly, the dimension in the first direction D1 of a pixel Pct in the adjusted C-component image CI2 is two times a dimension Ph in the first direction D1 of a pixel Pc in the pre-adjusted C-component image CI1 (2×Ph). Further, the dimension in the second direction D2 of a pixel Pct in the adjusted C-component image CI2 is identical to a dimension Pw in the second direction D2 of a pixel Pc in the pre-adjusted C-component image CI1.

The plurality of correspondence pixels corresponding to a target pixel can be defined as follows. Under the assumed conditions (1)-(3) described above, the pre-adjusted C-component image CI1 is shifted a prescribed amount in the first direction D1 relative to the adjusted C-component image CI2 and superimposed on the adjusted C-component image CI2.

In this state, the pixels in the pre-adjusted C-component image CI1 that overlap a target pixel in the adjusted C-component image CI2 are correspondence pixels. Here, the prescribed shift amount is (½)Ph in the first embodiment, i.e., half the dimension Ph in the first direction D1 for a single pixel in the pre-adjusted C-component image CI1. While the prescribed shift amount may be a value other than (½)Ph, the shift amount is preferably set to a value smaller than the dimension Ph in the first direction D1 for a single pixel in the pre-adjusted C-component image CI1.

FIG. 6 shows row numbers n that indicate the positions of pixels in the first direction D1 for the pre-adjusted C-component image CI1 and adjusted C-component image CI2, and column numbers m that indicate the positions of pixels in the second direction D2. A single pixel in the images CI1 and CI2 can be identified by the combination of row number n and column number m (n, m).

When the pre-adjusted C-component image CI1 and adjusted C-component image CI2 are superimposed as described above, regions in the pre-adjusted C-component image CI1 overlapped by three pixels Pct(4, 1), Pct(3, 3), and Pct(2, 5) in the adjusted C-component image CI2 are indicated by dashed lines in the pre-adjusted C-component image CI1 of FIG. 6. Thus, the correspondence pixels corresponding to the pixel Pct(4, 1), for example, are the three pixels Pc(6, 1), Pc(7, 1), and Pc(8, 1). In the first embodiment, correspondence pixels for a pixel Pct(n, m) are the three pixels Pc(2n−2, m), Pc(2n−1, m), and Pc(2n, m) aligned in the first direction D1.

Hence, when the target pixel is pixel Pct(n, m) in S215 of FIG. 5, the CPU 110 acquires three cyan gradation values Cin(1n−2, m), Cin(2n−1, m), and Cin(2n, m) of the three correspondence pixels Pc(2n−2, m), Pc(2n−1, m), and Pc(2n, m) corresponding to the pixel Pct(n, m).

In S220 the CPU 110 sets the gradation value for the target pixel in the adjusted C-component image CI2. When the target pixel is pixel Pct(n, m), the C-component gradation value Cout(n, m) for the target pixel Pct(n, m) is expressed by equation (1) below using the three C-component gradation values acquired in S215.

$$Cout(n,m)=Wc(2n-2,m)\times Cin(2n-2,m)+Wc(2n-1,m)\times Cin(2n-1,m)+Wc(2n1,m)\times Cin(2n,m) \quad (1)$$

In equation (1), Wc(2n−2, m), Wc(2n−1, m), and Wc(2n, m) are weights for the correspondence pixels Pc(2n−2, m), Pc(2n−1, m), and Pc(2n, m), respectively. In other words, the C-component gradation value Cout(n, m) for the target pixel is the average weighted value of the C-component gradation values for the three correspondence pixels.

The weights Wc(2n−2, m), Wc(2n−1, m), and Wc(2n, m) are set based on the percentages of overlapped areas of the correspondence pixels Pc(2n−2, m), Pc(2n−1, m), and Pc(2n, m) overlapped by the target pixel Pct(n, m) when the pre-adjusted C-component image CI1 and adjusted C-component image CI2 are superimposed as described above.

Take as an example the correspondence pixel Pc(6, 1) of the Pct(4, 1). The pixel Pct(4, 1) overlaps half the region of the correspondence pixel Pc(6, 1). The pixel Pct(4, 1) also overlaps the entire correspondence pixel Pc(7, 1) and half the region of the correspondence pixel Pc(8, 1). Therefore, the ratio of weights for the three correspondence pixels are Wc(6, 1):Wc(7, 1):Wc(8, 1)=(½):1:(½). However, since these three weights are normalized so that their total is 1, the weights Wc(6, 1), Wc(7, 1), and Wc(8, 1) are set to (¼), (½), and (¼).

In the first embodiment, the weights Wc(2n−2, m), Wc(2n−1, m), and Wc(2n, m) for the three correspondence pixels Pc(2n−2, m), Pc(2n−1, m), and Pc(2n, m) to the target pixel Pct(n, m) are (¼), (½), and (¼). Accordingly, the above equation (1) can be rewritten as shown in equation (2) below.

$$Cout(n,m)=\{Cin(2n-2,m)+2Cin(2n-1,m)+Cin(2n,m)\}/4 \quad (2)$$

In S225 the CPU 110 determines whether the above process has been performed on all pixels in the adjusted C-component image CI2. If there remain unprocessed pixels (S225: NO), the CPU 110 returns to S210 and selects an unprocessed pixel as the target pixel. However, if all pixels have been processed (S225: YES), in S230 the CPU 110 determines whether the above process has been performed on all chromatic components, i.e., all three CMY components. If there remain unprocessed chromatic components (S230: NO), the CPU 110 returns to S205 and selects an unprocessed component as the target component. However, if all chromatic components have been processed (S230: YES), the CPU 110 advances to S235. Upon advancing to the process in S235, adjusted component image data has been generated for all chromatic colors.

In S235 the CPU 110 selects the K-component (K layer) as the target component (target component). In S240 the CPU 110 selects one of the (E1×F1) pixels in the adjusted K-component image whose gradation value has not yet been set as the target pixel.

Figure 7:
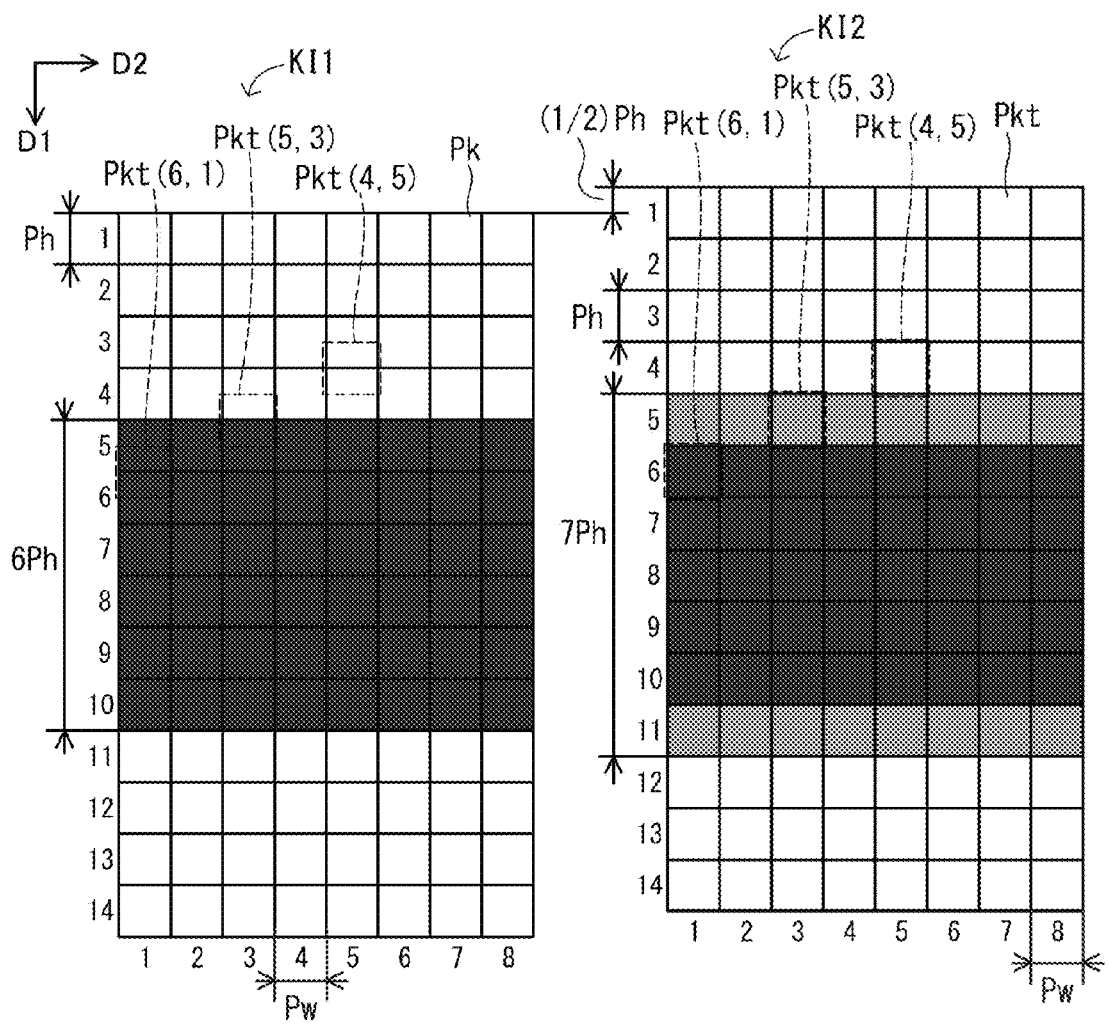
FIG. 7 is an explanatory diagram illustrating a process of generating adjusted component image data for K component in the first embodiment.

In S245 the CPU 110 acquires gradation values for the plurality of correspondence pixels in the pre-adjusted component image that correspond to the target pixel. FIG. 7 is an explanatory diagram illustrating how the adjusted K-component image data is generated.

The grid in the left side of FIG. 7 depicts a part of a pre-adjusted K-component image KI1. The grid in the right side of FIG. 7 depicts a part of an adjusted K-component image KI2. These images KI1 and KI2 are depicted based on the assumed conditions (1)-(3) described above.

As described above, the pre-adjusted K-component image KI1 and the adjusted K-component image KI2 are images having the pixel number (E1×F1). Therefore, under the assumed conditions (1)-(3) described above, the dimension in the first direction D1 of a pixel Pkt in the adjusted K-component image KI2 is equivalent to the dimension Ph in the first direction D1 of a pixel Pk in the pre-adjusted K-component image KI1, and the dimension in the second direction D2 of a pixel Pkt in the adjusted K-component image KI2 is the same as the dimension Pw in the second direction D2 of a pixel Pk in the pre-adjusted K-component image KI1.

The correspondence pixels that correspond to the target pixel can be defined as follows in a similar manner to the process for the chromatic color components described above. Under the assumed conditions (1)-(3) described above, the pre-adjusted K-component image KI1 is shifted a prescribed distance in the first direction D1 relative to the adjusted K-component image KI2 and superimposed on the adjusted K-component image KI2. In this state, the plurality of pixels in the pre-adjusted K-component image KI1 that overlap the target pixel in the adjusted K-component image KI2 are correspondence pixels. Here, the prescribed amount of shift is (½)Ph in the first embodiment, i.e., half the dimension Ph in the first direction D1 for a single pixel in the pre-adjusted K-component image KI1.

As in FIG. 6, FIG. 7 shows row numbers n indicating the positions of pixels in the first direction D1, and column numbers m indicating the positions of pixels in the second direction D2 for the pre-adjusted K-component image KI1 and adjusted K-component image KI2.

When the pre-adjusted K-component image KI1 is superimposed over the adjusted K-component image KI2 as described above, regions in the pre-adjusted K-component image KI1 overlapped by the three pixels Pkt(6, 1), Pkt(5, 3), and Pkt(4, 5) in the adjusted K-component image KI2 are denoted by dashed lines in the pre-adjusted K-component image KI1 of FIG. 7. Thus, the pixel Pkt(6, 1) has two correspondence pixels Pk(5, 1) and Pk(6, 1). In the first embodiment, correspondence pixels for a pixel Pkt(n, m) are the two pixels Pk(n−1, m) and Pk(n, m) aligned in the first direction D1.

Hence, when the target pixel is the pixel Pkt(n, m) in S245 of FIG. 5, the CPU 110 acquires gradation values for the K-components of the two correspondence pixels Pk(n−1, m) and Pk(n, m) corresponding to the target pixel Pkt(n, m).

In S250 the CPU 110 determines the gradation value for the target pixel in the adjusted K-component image KI2. When the target pixel is pixel Pkt(n, m), the K-component gradation value Kout(n, m) of the target pixel Pkt(n, m) is represented by the following equation (3).

$$Kout(n,m)=Wk(n-1, m) \times Kin(n-1, m)+Wk(n,m) \times Kin(n, m) \quad (3)$$

Kin(n−1, m) and Kin(n, m) in equation (3) are the two K-component gradation values acquired in S245. Wk(n−1, m) and Wk(n, m) are weights for the correspondence pixels Pk(n−1, m) and Pk(n, m), respectively. In other words, the K-component gradation value Kout(n, m) for the target pixel is the average weighted value of the K-component gradation values for the two correspondence pixels.

The weights Wk(n−1, m) and Wk(n, m) are set based on the percentages of surface area of the correspondence pixels Pk(n−1, m) and Pk(n, m) overlapped by the target pixel Pkt(n, m) when the pre-adjusted K-component image KI1 and adjusted K-component image KI2 are superimposed as described above.

Taking as an example the pixel Pkt(6, 1) shown in FIG. 7, the pixel Pkt(6, 1) overlaps half the region of each of the two correspondence pixels Pk(5, 1) and Pk(6, 1). Therefore, the ratio of weights for the two correspondence pixels are Wk(5, 1):Wk(6, 1)=1:1. However, since these two weights are normalized so that their total is 1, the weights Wk(5, 1) and Wk(6, 1) are set to (½) and (½).

In the first embodiment, the weights Wk(n−1, m) and Wk(n, m) for the two correspondence pixels Pk(n−1, m) and Pk(n, m) to the target pixel Pkt(n, m) are (½) and (½). Accordingly, the above equation (1) can be rewritten as shown in equation (4) below.

$$Kout(n, m)=\{Kin(n-1, m)+Kin(n, m)\}/2 \quad (4)$$

In S255 the CPU 110 determines whether the above process has been performed on all pixels in the adjusted K-component image KI2. If there remain any unprocessed pixels (S255: NO), the CPU 110 returns to S240 and selects an unprocessed pixel as the target pixel. However, if all pixels have been processed (S255: YES), the CPU 110 ends the current adjustment process. Through the process of S235-S255 described above, the CPU 110 generates adjusted K-component image data. Thus, the adjustment process serves to generate adjusted CMYK image data that includes a set of adjusted component image data for each of the CMYK color components.

In S235-S255 of the adjustment process according to the first embodiment described above with reference to FIG. 5, the CPU 110 generates adjusted K-component image data representing an adjusted K-component image having a pixel number in the first direction D1 corresponding to a first resolution (600 dpi in the first embodiment) based on the pre-adjusted K-component image data. Further, in S205-S230 of FIG. 5, the CPU 110 uses the pre-adjusted chromatic component image data to generate three sets of adjusted chromatic image data representing adjusted component images for the three chromatic colors whose pixel numbers in the first direction D1 correspond to a second resolution (300 dpi in the first embodiment) lower than the first resolution. Accordingly, the printer 100 generates CMYK image data through the adjustment process.

Here, the gradation value for a target pixel in the adjusted chromatic component image is generated using the gradation values for a plurality of correspondence pixels (S215 and S220 of FIG. 5). The plurality of correspondence pixels are the pixels overlapped by the target pixel when the chromatic component image is shifted the prescribed shift amount in the first direction D1 ((½)Ph in the first embodiment) and superimposed over the adjusted chromatic component image. Setting correspondence pixels by shifting the component image a distance smaller than the width of one pixel and superimposing the two images can improve the quality of the adjusted component image.

This process will be described in greater detail with reference to FIG. 6. In the pre-adjusted C-component image CI1 on the left side of FIG. 6, the pixels Pc include a white pixel Pa denoting a low-density pixel whose gradation value is the minimum value (0), and a black pixel Pct depicting a high-density pixel whose gradation value is the maximum value (255). More specifically, the pre-adjusted C-component image CH on the left side of FIG. 6 depicts an image of a line extending horizontally through the center region in the first direction D1 having a line width equivalent to six pixels Pc (6×Ph).

The adjusted C-component image CI2 on the right side of FIG. 6 generated based on this pre-adjusted C-component image CH includes a low-density pixel Pct1, a high-density pixel Pct2, and two types of medium-density pixels Pct3 and Pct4. In the example of FIG. 6, the medium-density pixel Pct3 has a gradation value of 32, while the medium-density pixel Pct4 has a gradation value of 96. Hence, the adjusted C-component image CI2 on the right side of FIG. 6 depicts an image of a line extending horizontally and having a line width equivalent to four pixels Pct, i.e., a line width equivalent to eight pixels Pc (8×Ph). Further, the sharpness of the line's edges is reduced.

Figure 8:
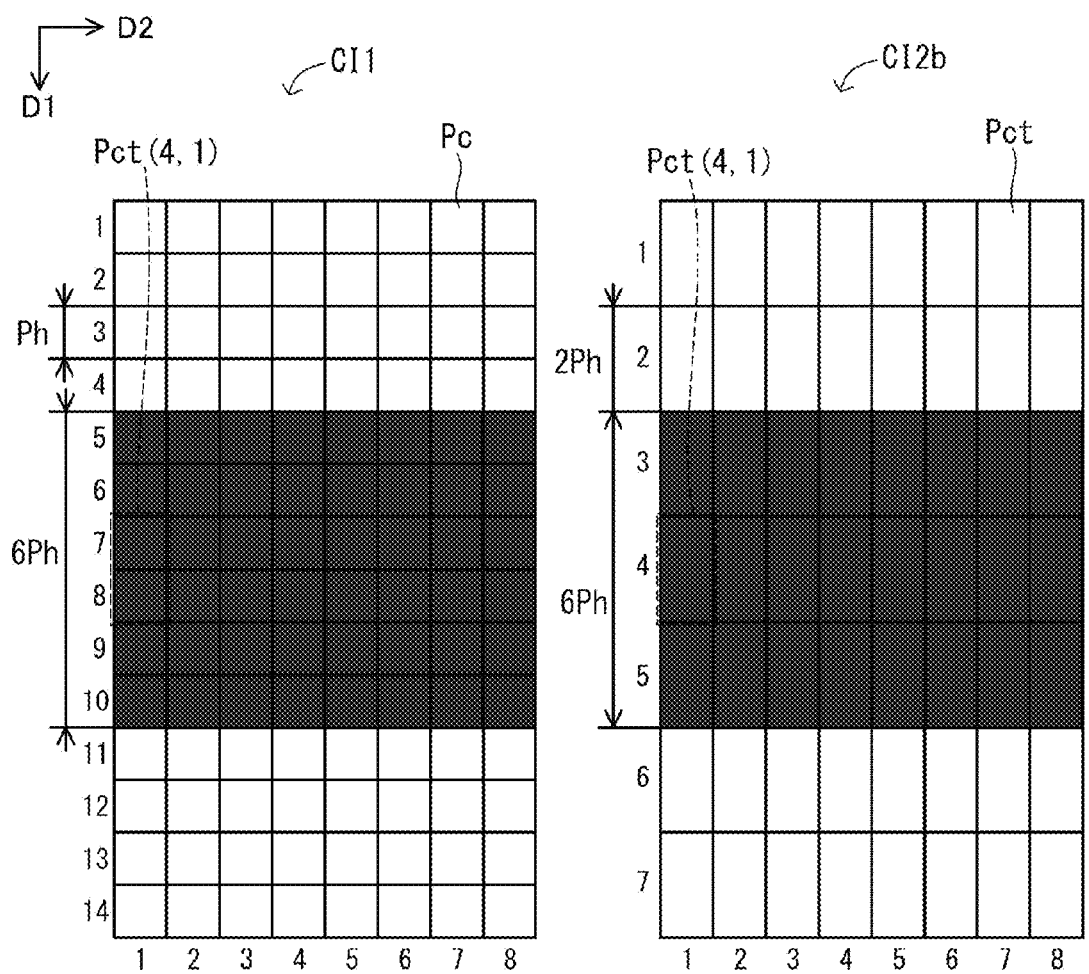
FIGS. 8 and 9 are explanatory diagrams illustrating a process of generating adjusted C-component image data in a comparative example.
Figure 9:
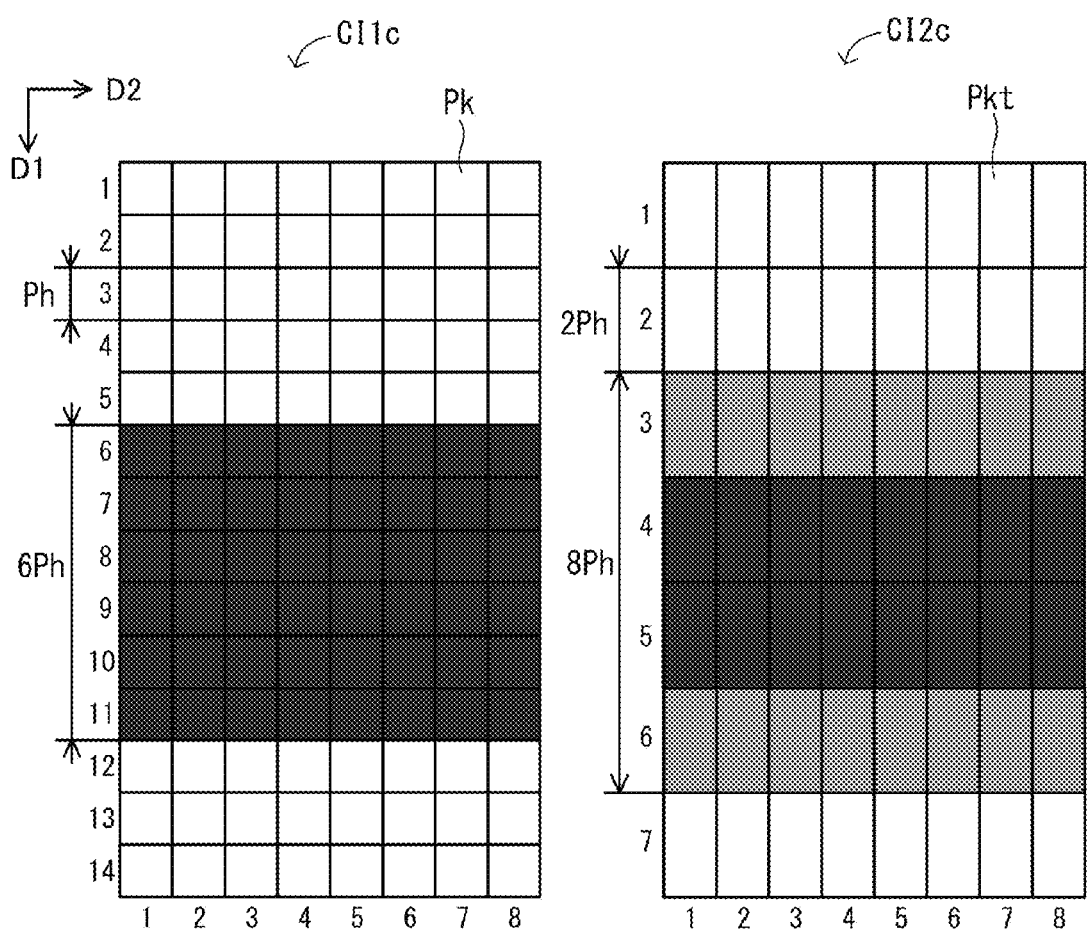

To facilitate understanding, a comparative example will be described next. FIGS. 8 and 9 are explanatory diagrams illustrating the process of generating adjusted C-component image data in a comparative example. The grid on the left side of FIG. 8 depicts a part of the pre-adjusted C-component image CI1. In the comparative example, the pre-adjusted C-component image CH is identical to the pre-adjusted C-component image CI1 on the left side of FIG. 6. The grid on the right side of FIG. 8 depicts a part of an adjusted C-component image CI2b generated by executing the process in the comparative example on the pre-adjusted C-component image CI1. The grid on the left side of FIG. 9 depicts a part of a pre-adjusted C-component image CI1c. The pre-adjusted C-component image CI1c differs from the pre-adjusted C-component image CH of FIG. 8 in that the line having line width (6×Ph) is shifted one pixel in the first direction D1. The grid on the right side of FIG. 9 depicts a part of an adjusted C-component image CI2c generated by executing a process according to the comparative example on the pre-adjusted C-component image Mc. These images CI1, CI2b, CI1c, and CI2c are depicted according to the assumed conditions (1)-(3) described above in the first embodiment.

According to the method of the comparative example, the pre-adjusted chromatic component image is not shifted relative to the adjusted chromatic component image but is superimposed exactly over the image under the assumed conditions (1)-(3) described above. The pixels in the pre-adjusted C-component image that overlap the target pixel in the adjusted C-component image when the images are superimposed are correspondence pixels. The weights for these correspondence pixels are set based on the percentages of surface area of the corresponding correspondence pixels overlapped by the target pixel. Hence, the C-component gradation value Cout(n, m) for the target pixel Pct(n, m) in the comparative example is expressed by equation (5) below using the two C-component gradation values Cin(n−1, m) and Cin(n, m) of the two correspondence pixels Pc(n−1, m) and Pc(n, m).

$$\text{Cout}(n,m) = \{\text{Cin}(n-1,m) + \text{Cin}(n,m)\}/2 \qquad (5)$$

In the example of FIG. 8, the line of width (6×Ph) in the pre-adjusted C-component image CI1 is maintained at the same width (6×Ph) in the adjusted C-component image CI2b. Thus, the edges of the line are maintained at a high sharpness. However, in the example of FIG. 9, the line of width (6×Ph) in the pre-adjusted C-component image CI1c becomes a line having the width (8×Ph) in the adjusted C-component image CI2c. Thus, the sharpness of edges on the line is decreased. Consequently, the process of the comparative example may change the thickness and sharpness of an object such as a specific line in the adjusted component image, depending on the position in the first direction D1 of the object in the pre-adjusted component image. For example, a plurality of lines having the same width and sharpness in a pre-adjusted component image may be changed to lines having differing thicknesses and sharpnesses in the adjusted component image depending on the positions of their rows in the pre-adjusted component image.

In contrast, the adjustment process according to the first embodiment can suppress such irregularities in line width and sharpness when reducing the number of pixels in the first direction D1 for a chromatic component image since the correspondence pixels are set after shifting the pre-adjusted chromatic component images a prescribed amount ((½)Ph) when superimposing the pre-adjusted component image on the adjusted component image. Thus, when a line having the width (6×Ph) in the pre-adjusted C-component image CI1, for example, becomes a line of width (8×Ph) in the adjusted C-component image CI2, regardless of the position of the line in the first direction D1, thereby decreasing sharpness in the line's edges. As a result, this process can improve the quality of the adjusted component image.

Further, in the first embodiment, K-component pixel data is subjected to the adjustment process in steps S235-S255 of FIG. 5 regardless of whether the number of pixels in the first direction D1 needs to be modified. Here, the gradation value of a target pixel in the adjusted K-component image is generated using the gradation values of a plurality of correspondence pixels (S245 and S250 of FIG. 5). Here, the correspondence pixels are the plurality of pixels overlapped by the target pixel when the pre-adjusted K-component image is shifted a prescribed amount in the first direction D1 ((½)Ph in the first embodiment) when superimposed over the adjusted K-component image.

As a result, the line having the width (6×Ph) in the pre-adjusted K-component image KI1 becomes a line having width (7×Ph) in the adjusted K-component image KI2, reducing the sharpness of the line's edges. Consequently, the width of the line in the adjusted K-component image KI2 and the sharpness of its edges approach the width of the lines in the adjusted chromatic component images and the sharpness of their edges, respectively. Thus, it is possible to improve the quality of a processed image, such as an image formed by superimposing four adjusted component images for the colors CMYK, for example. This can also lead to an improvement in the quality of the dot image (printed image) represented by subsequently generated dot data and can suppress artifacts, such as unnaturally appearing edges.

Next, the effects of the first embodiment will be described in greater detail. As described above, the width of a line in the adjusted chromatic component images and the sharpness of its edges are lower than in the pre-adjusted chromatic component images. Consider if the adjustment process were not performed on the K-component image and the unaltered K-component image were used as the K-component layer in the adjusted CMYK image data. In this case, differences would appear between the line width and sharpness in the K-component image and the line width and sharpness in the adjusted chromatic component images. As a result, the same edges in the image rendered by the K-component image and the adjusted chromatic component images may have noticeable deviation of the positions and have noticeable differences in sharpness, leading to a decline in image quality. However, the method according to the first embodiment suppresses the occurrence of these artifacts, improving the quality of the processed image.

As shown in equation (1) of the first embodiment, weights set for the correspondence pixels, such as the Wc(2n−2, m), Wc(2n−1, m), and Wc(2n, m) described above, are used to set the gradation value for a target pixel in the adjusted chromatic component image. The weights Wc(2n−2, m), Wc(2n−1, m), and Wc(2n, m) are set on the basis of the percentages of surface area of the corresponding correspondence pixels Pc(2n−2, m), Pc(2n−1, m), and Pc(2n, m) overlapped by the target pixel Pct(n, m) when the pre-adjusted C-component image CI1 and adjusted C-component image CI2 are superimposed as described above. A similar process is performed to set the weights Wk(n−1, m) and Wk(n, m) used when calculating the gradation value of a target pixel in the adjusted K-component image. Thus, the quality of the processed image can be improved by suitably setting gradation values of target pixels in the adjusted component images.

In the first embodiment described above, the pre-adjusted K-component image data has the same number of pixels in the first direction D1 as the adjusted K-component image data. In other words, the process for generating adjusted K-component image data from the pre-adjusted K-component image data (S235-S255 of FIG. 5) does not include a process for modifying or reducing the number of pixels in the first direction D1. On the other hand, the number of pixels in the first direction D1 in the adjusted chromatic component image data is half the number of pixels in the first direction D1 for the pre-adjusted chromatic component image data. In other words, the process for generating adjusted chromatic component image data from the pre-adjusted chromatic component image data (S210-S225 of FIG. 5) includes a step for decreasing the number of pixels in the first direction D1. Since adjusted K-component image data is generated in the adjustment process described above, the printer 100 can improve the quality of the processed image despite the pre-adjusted K-component image data having the same number of pixels in the first direction D1 as the adjusted K-component image data.

The shift amount in the pre-adjusted K-component image KI1 (hereinafter called the "first distance") when superimposing the pre-adjusted K-component image KI1 on the adjusted K-component image KI2 is the same as the shift amount in the pre-adjusted C-component image CI1 (hereinafter called the "second distance") when superimposing the pre-adjusted C-component image CI1 on the adjusted C-component image CI2. In other words, the first distance and the second distance are both (½)Ph in the first embodiment; i.e., the difference between the first and second distances is 0. This is because a center of gravity of an object in the K-component image KI2 need not be shifted in the first direction D1 relative to a center of gravity of an object of the adjusted C-component image CI2 since the center of gravity in the first direction D1 of the J nozzles in the black nozzle group Nk is aligned with the center of gravity in the first direction D1 of the (J/2) nozzles in the chromatic nozzle groups Nc, Nm, and Ny, as described above in the first embodiment.

More specifically, the center of gravity of an object in the adjusted K-component image KI2 in the first direction D1 is shifted the first distance in the first direction D1 relative to the center of gravity of the object in the pre-adjusted K-component image KI1. Similarly, the center of gravity of an object in the adjusted C-component image CI2 in the first direction D1 is shifted the second distance in the first direction D1 relative to the center of gravity of the object in the pre-adjusted C-component image CI1. Since the first distance and second distance are equivalent in the first embodiment, an object in the adjusted chromatic component image has a center of gravity in the first direction D1 that matches the same object in the adjusted K-component image.

As a result, no deviation in the center of gravity of an object occurs between the K-component dot image and the chromatic-component dot images in the printed image, thereby improving the quality of the printed image. In other words, when the center of gravity in the first direction D1 of the J nozzles in the black nozzle group Nk is aligned with the center of gravity in the first direction D1 of the (J/2) nozzles in the chromatic nozzle groups Nc, Nm, and Ny, a drop in the quality of the printed image can be more effectively suppressed by setting the first and second distances equal to each other.

Note that the difference between the first and second distances is preferably not 0 (i.e., the first and second distances are preferably not equal to each other) when the center of gravity in the first direction D1 of the J nozzles in the black nozzle group Nk is offset from the center of gravity in the first direction D1 of the (J/2) nozzles in the chromatic nozzle groups Nc, Nm, and Ny. This example will be described in the second embodiment. In this case, the first and second distances are preferably determined on the basis of on the positions in the first direction D1 of nozzles in the chromatic nozzle groups Nc, Nm, and Ny relative to the positions in the first direction D1 of nozzles in the black nozzle group Nk. This method can more effectively suppress a drop in the quality of images printed using the printing unit 180.

B. Second Embodiment

Figure 10:
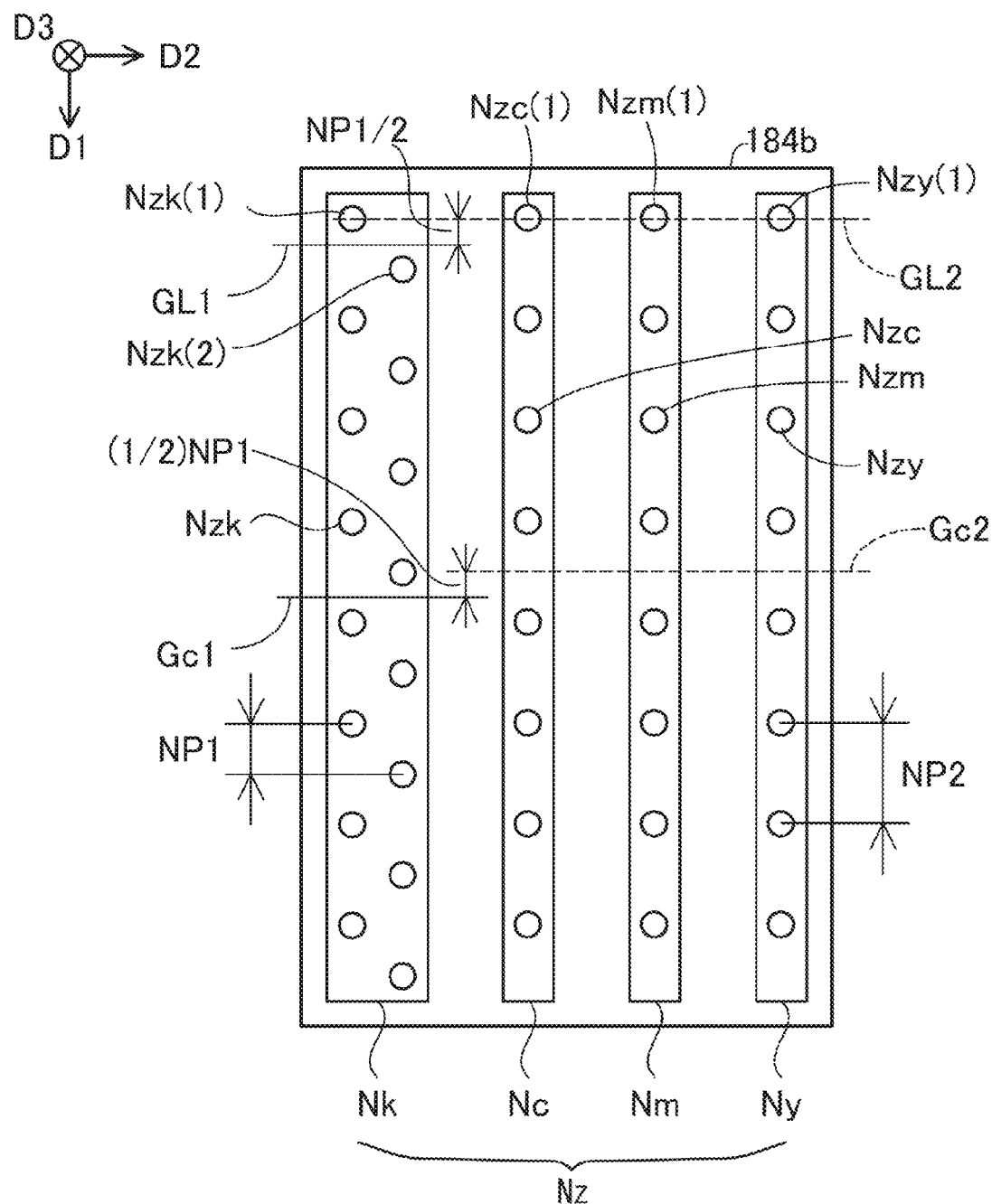
FIG. 10 shows an example of a layout of nozzles of a print head in a second embodiment.

The printer 100 according to the second embodiment is provided with a print head 184b configured differently from the print head 184 of the first embodiment (see FIG. 2). FIG. 10 illustrates the layout of nozzles provided in the print head 184b. In the print head 184b, the center of gravity Gc1 in the first direction D1 of the J nozzles included in the black nozzle group Nk is offset a prescribed distance in the first direction D1 from the center of gravity Gc2 in the first direction D1 of the (J/2) nozzles included in the chromatic nozzle groups Nc, Nm, and Ny. This prescribed distance will be called the nozzle offset ΔN. As shown in FIG. 10, the nozzle offset ΔN in the second embodiment is half the nozzle pitch NP1 for the J nozzles in the black nozzle group Nk ((½)NP1).

When the centers of gravity are offset in this way, the $i^{th}$ cyan, magenta, and yellow nozzles Nzc(i), Nzm(i), and Nzy(i) from the upstream side in the first direction D1 are at the same position in the first direction D1 as the $(2i-1)^{th}$ black nozzle Nzk(2i-1) from the upstream side in the first direction D1. For example, as shown in FIG. 10, the nozzles Nzc(1), Nzm(1), and Nzy(1) are at the same position in the first direction D1 as the black nozzle Nzk(1) and fall on a centerline GL2 passing through the black nozzle Nzk(1).

The remaining structure of the print head 184b in FIG. 10 is identical to the structure of the print head 184 in FIG. 2.

Figure 11:
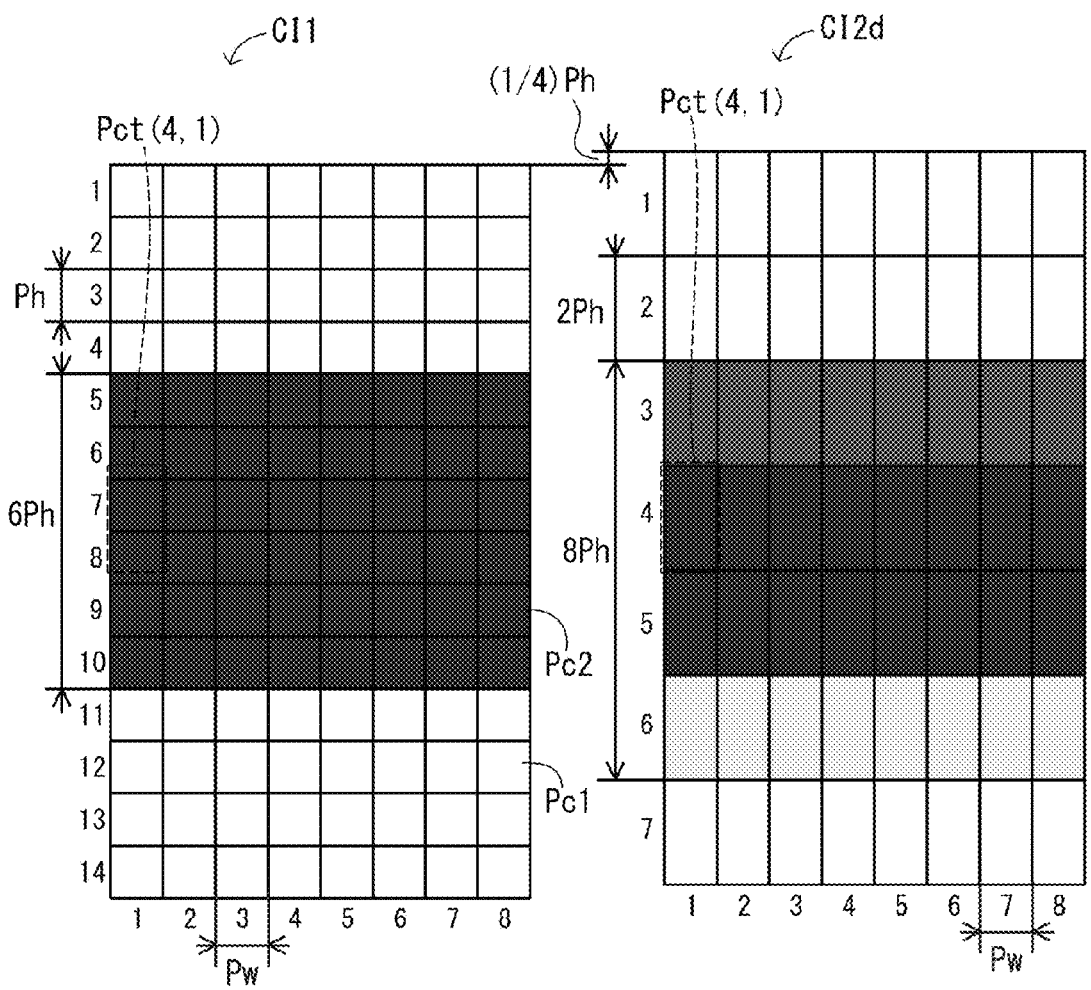
FIG. 11 is an explanatory diagram illustrating a process of generating adjusted component image data for C component in the second embodiment.
Figure 12:
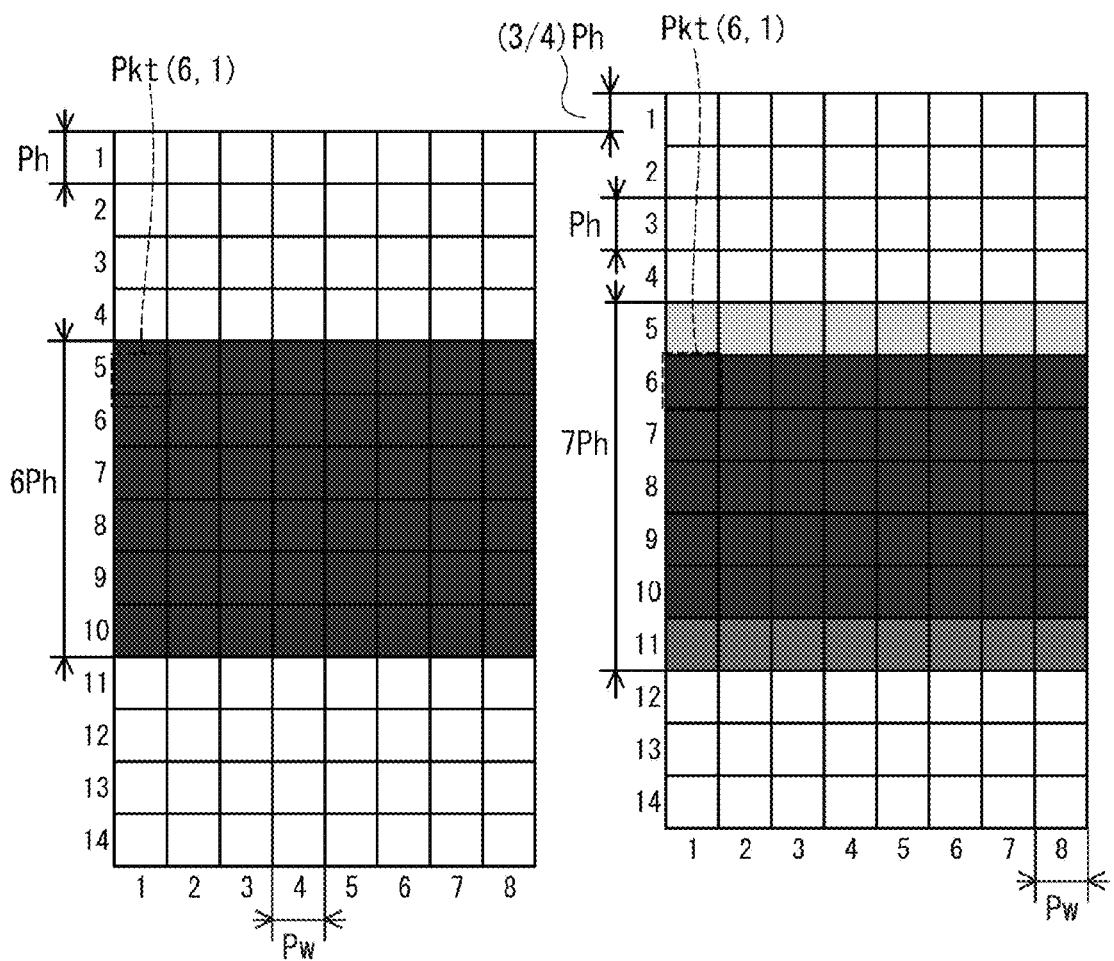
FIG. 12 is an explanatory diagram illustrating a process of generating adjusted component image data for K component in the second embodiment.

FIG. 11 is an explanatory diagram illustrating the method of generating adjusted C-component image data in the second embodiment. FIG. 12 is an explanatory diagram illustrating the method of generating adjusted K-component image data in the second embodiment.

In the adjustment process according to the second embodiment, the first and second distances described above differ from the first and second distances in the first embodiment. That is, while both the first and second distances are set to (½)Ph in the adjustment process according to the first embodiment described above, the first and second distances are set to different values in the adjustment process according to the second embodiment. Specifically, the second distance is set to (¼)Ph, as shown in FIG. 11, and the first distance is set to (¾)Ph, as shown in FIG. 12.

Since the second distance is (¼)Ph, the process according to the second embodiment for generating adjusted component image data representing the adjusted C-component image CI2d (right side in FIG. 11) using the component image data representing the pre-adjusted C-component image CI1 (left side in FIG. 11) differs from the process described in the first embodiment.

In the second embodiment, the three correspondence pixels corresponding to the target pixel are the same as in the first embodiment. Therefore, the target pixel Pct(n, m) has the three correspondence pixels Pc(2n−2, m), Pc(2n−1, m), and Pc(2n, m), just like in the first embodiment.

However, the weights applied to the correspondence pixels in the second embodiment differ from those used in the first embodiment. Specifically, the weights Wc(2n−2, m), Wc(2n−1, m), and Wc(2n, m) for the three correspondence pixels Pc(2n−2, m), Pc(2n−1, m), and Pc(2n, m) are set to (⅛), (4/8), and (⅜).

Hence, the C-component gradation value Cout(n, m) for the target pixel Pct(n, m) is expressed by equation (6) below using the C-component gradation values Cin(2n−2, m), Cin(2n−1, m), and Cin(2n, m) of the three correspondence pixels.

$$Cout=\{Cin(2n-2,m)+4\times Cin(2n-1,m)+3\times Cin(2n,m)\}/8 \quad (5)$$

Further, since the first distance is (¾)Ph, the process of the second embodiment for generating adjusted component image data representing an adjusted K-component image KI2d (right side in FIG. 12) using component image data representing the pre-adjusted K-component image KI1 (left side in FIG. 12) differs from the process described in the first embodiment.

In the second embodiment, two correspondence pixels corresponding to a target pixel are the same as those described in the first embodiment. Therefore, the target pixel Pkt(n, m) has the two correspondence pixels Pk(n−1, m) and Pk(n, m), just like in the first embodiment.

However, the weights assigned these two correspondence pixels in the second embodiment differ from those used in the first embodiment. Specifically, the weights Wk(n−1, m) and Wk(n, m) for the two correspondence pixels Pk(n−1, m) and Pk(n, m) are set to (¾) and (¼), respectively.

Hence, the K-component gradation value Kout(n, m) for the target pixel Pkt(n, m) is expressed by equation (7) below using the K-component gradation values Kin(n−1, m) and Kin(n, m) of the two correspondence pixels.

$$Kout(n,m)=\{3\times Kin(n-1,m)+Kin(n,m)\}/4 \quad (7)$$

All remaining steps in the adjustment process according to the second embodiment are identical to those in the adjustment process described in the first embodiment.

In the second embodiment described above, the first and second distances are set based on the positions in the first direction D1 of the (J/2) nozzles included in the chromatic nozzle groups Nc, Nm, and Ny relative to the positions in the first direction D1 of the J nozzles included in the black nozzle group Nk. Thus, the configuration of the second embodiment can improve the quality of printed images.

More specifically, in the second embodiment the center of gravity Gc1 in the first direction D1 of the J nozzles included in the black nozzle group Nk is offset in the first direction D1 by a nozzle offset ΔN=(½)NP1 from the center of gravity Gc2 in the first direction D1 of the (J/2) nozzles included in the chromatic nozzle groups Nc, Nm, and Ny, as described above. Accordingly, when a K-component dot image and chromatic component dot images of the same size are printed on paper, the K-component dot image is shifted from the chromatic component dot images in the first direction D1 by (½)NP1.

Here, (½)NP1 is equivalent to (½)Ph, i.e., half the dimension in the first direction D1 of a pixel in the pre-adjusted K-component image KI1. In the second embodiment, the first distance is preset to (¾)Ph and the distance to (¼)Ph in order that the difference ΔD between the first and second distances is (½)Ph. As a result, processed image data representing these adjusted component images KI2d and CI2d is generated such that the object in the adjusted C-component image CI2d is shifted (½)Ph in the first direction D1 relative to the object in the adjusted K-component image KI2d. As a result, when dot data is generated using this processed image data, the objects described above are offset between the K-component dot image and chromatic component dot images rendered by the dot data. Thus, when printing an image based on this dot data, offset between objects due to the nozzle offset ΔN and offset between objects due to the dot data cancel each other. Accordingly, this method can improve the quality of the printed image by, for example, suppressing noticeable deviations between edges appearing the K-component dot image and the same edges appearing in the chromatic component dot images.

In order that the deviation between objects caused by the positions of nozzles in the first direction D1 and the deviation between objects caused by the dot data cancel each other out, the first and second distances are preferably set in the second embodiment so that the nozzle offset ΔN is equivalent to the difference ΔD between the first distance and the second distance. In the second embodiment, the nozzle offset ΔN is set to (½)NP1=(½)Ph and the difference ΔD is set to ((¾)Ph−(¼)Ph)=(½)Ph. Accordingly, the nozzle offset ΔN is equivalent to the difference ΔD between the first and second distances in the second embodiment. In other words, the first and second distances are preferably set such that the difference ΔD between the first and second distances is larger for larger nozzle offsets ΔN, thereby suppressing a drop in the quality of printed images caused by the nozzle offset ΔN.

In the second embodiment described above, the first and second distances are set to different values when the center of gravity Gc1 in the first direction D1 of the J nozzles in the black nozzle group Nk differs from the center of gravity Gc2 in the first direction D1 of the (J/2) nozzles in the chromatic nozzle groups Nc, Nm, and Ny. Thus, the second embodiment can more effectively suppress a drop in quality of printed images when the center of gravity Gc1 and center of gravity Gc2 are different.

C. Variations of the Embodiments (1) In the adjustment process of the first and second embodiments described above (FIG. 5), the number of pixels aligned in the first direction D1 of the adjusted K-component image KI2 is equivalent to the number of pixels aligned in the first direction D1 of the pre-adjusted K-component image KI1. However, the adjustment process may be configured to reduce the number of pixels in the adjusted K-component image KI2 in the first direction D1 from the number of pixels in the pre-adjusted K-component image KI1 for the same dimension. For example, if the number of pixels in the first direction D1 for each pre-adjusted CMYK component image is E3 (equivalent to 1200 dpi), then the number of pixels in the first direction D1 for the adjusted K-component image KI2 may be reduced to (E3/2) (equivalent to 600 dpi). In this case, the number of pixels in the first direction D1 for the adjusted C-component image CI2 may be reduced to (E3/4) (equivalent to 300 dpi).

(2) In the second embodiment described above, the first and second distances are set such that the nozzle offset ΔN is equivalent to the difference ΔD between the first and second distances. However, the first and second distances do not necessarily have to be set such that nozzle offset ΔN is precisely equivalent to the difference ΔD between the first and second distances. For example, although the first distance is set to (¾)Ph and the second distance to (¼)Ph in the second embodiment described above, the first distance may be set to (½)Ph and the second distance to (¼)Ph. In general, if the nozzle offset ΔN is not 0, then it is preferable to set the first and second distances such that the difference ΔD between the first and second distances approaches the nozzle offset ΔN rather than setting the first and second distances equal to each other (ΔD=0). It is also preferable to set the first and second distances so that the difference ΔD between the first and second distances is larger for larger nozzle offsets ΔN.

(3) The adjustment process of the first and second embodiments described above includes a process for generating adjusted chromatic component image data based on the pre-adjusted chromatic component image data and having a pixel number in the first direction D1 equivalent to 300 dpi resolution, and a process for generating adjusted K-component image data from the pre-adjusted K-component image data and having a pixel number in the first direction D1 equivalent to 600 dpi resolution. However, the first and second embodiments are merely examples, and the disclosure is not limited to using resolutions of 300 dpi and 600 dpi or having CMYK as the color components. In general, it is preferable that the adjustment process include (1) a process for generating adjusted first component image data in which the pixel number (pixel count) in a first direction is a first pixel number equivalent to a first resolution using first component image data including gradation values of a first color component for all pixels, and (2) a process for generating second adjusted component image data in which the pixel number (pixel count) in the first direction is a second pixel number equivalent to a second resolution lower than the first resolution using second component image data that includes gradation values of a second color component for all pixels.

(4) The process executed by the printer 100 according to the first and second embodiments (see FIG. 5) may be executed on a terminal device that is connected to and capable of communicating with the printer 100 (a smartphone or personal computer, for example). For example, a printer driver program may be installed on the terminal device, and the CPU of the terminal device may implement the printing process described above by executing the printer driver program. In this case, the terminal device may generate a print job through the printing process that includes print data and may transmit this print job to the printer 100 serving as the printing unit in order to control the printer 100 to execute a printing operation.

(5) Part of the configuration implemented in hardware in the embodiments described above may be replaced with software and, conversely, all or part of the configuration implemented in software in the embodiments may be replaced with hardware.

While the description has been made in detail with reference to specific embodiments and variations thereof, the embodiments and variations do not limit the scope of the disclosure, but are examples to facilitate understanding. It would be apparent to those skilled in the art that various changes and modifications may be made therein without departing from the spirit and scope of the above described embodiments.

What is claimed is:

1. An image processing apparatus comprising a controller configured to perform:
   acquiring image data representing an image and including first component image data and second component image data, the first component image data representing a first component image including a plurality of pixels each having a gradation value of a first color component, the second component image data representing a second component image including a plurality of pixels each having a gradation value of a second color component;
   adjusting the first component image data to generate adjusted first component image data, the adjusted first component image data representing an adjusted first component image including a plurality of pixels each having a gradation value of the first color component, a pixel count in a first direction of the adjusted first component image being determinative of a first resolution, the adjusted first component image data being generated by:
   selecting a first target pixel from the plurality of pixels in the adjusted first component image;
   acquiring gradation values of first correspondence pixels, the first correspondence pixels being at least two of the plurality of pixels in the first component image that are overlapped by the first target pixel when the first component image is shifted a first distance in the first direction relative to the adjusted first component image and superimposed in the adjusted first component image under assumed conditions (a)-(d):
   (a) a dimension of the first component image in the first direction is identical to a dimension of the adjusted first component image in the first direction;
   (b) a dimension of the first component image in the second direction is identical to a dimension of the adjusted first component image in the second direction;
   (c) the plurality of pixels in the first component image is arranged in a grid form, each pixel in the first component image having a first height in the first direction and a first width in the second direction, the first height being determined on a basis of a pixel count in the first direction of the first component image, the first width being determined on a basis of a pixel count in the second direction of the first component image; and
   (d) the plurality of pixels in the adjusted first component image is arranged in a grid form, each pixel in the adjusted first component image having a second height in the first direction and a second width in the second direction, the second height being determined on a basis of the pixel count in the first direction of the adjusted first component image, the second width being determined on a basis of a pixel count in the second direction of the adjusted first component image; and
   determining a gradation value of the first target pixel on a basis of gradation values of the first correspondence pixels;
   adjusting the second component image data to generate adjusted second component image data, the adjusted second component image data representing an adjusted second component image including a plurality of pixels each having a gradation value of the second color component, a pixel count in the first direction of the adjusted second component image being determinative of a second resolution lower than the first resolution, the adjusted second component image data being generated by:
   selecting a second target pixel from the plurality of pixels in the adjusted second component image;
   acquiring gradation values of second correspondence pixels, the second correspondence pixels being at least two of the plurality of pixels in the second component image that are overlapped by the second target pixel when the second component image is shifted a second distance in the first direction relative to the adjusted second component image and superimposed in the adjusted second component image under assumed conditions (e)-(h):
   (e) a dimension of the second component image in the first direction is identical to a dimension of the adjusted second component image in the first direction;
   (f) a dimension of the second component image in the second direction is identical to a dimension of the adjusted second component image in the second direction;
   (g) the plurality of pixels in the second component image is arranged in a grid form, each pixel in the second component image having a third height in the first direction and a third width in the second direction, the third height being determined on a basis of a pixel count in the first direction of the second component image, the third width being determined on a basis of a pixel count in the second direction of the second component image; and
   (h) the plurality of pixels in the adjusted second component image is arranged in a grid form, each pixel in the adjusted second component image having a fourth height in the first direction and a fourth width in the second direction, the fourth height being determined on a basis of the pixel count in the first direction of the adjusted second component image, the fourth width being determined on a basis of a pixel count in the second direction of the adjusted second component image; and
   determining a gradation value of the second target pixel on a basis of gradation values of the second correspondence pixels; and generating adjusted image data based on the adjusted first component image data and adjusted second component image data.

2. The image processing apparatus according to claim 1, wherein the pixel count in the first direction of each of the first component image and the second component image data is equal to the pixel count in the first direction of the adjusted first component image;
 wherein the adjusting of the first component image data excludes reducing the pixel count in the first direction of the adjusted first component image from the pixel count in the first direction of the first component image;
 wherein the adjusting of the second component image data further includes reducing the pixel count in the first direction of the adjusted second component image from the pixel count in the first direction of the second component image.

3. The image processing apparatus according to claim 1, wherein the controller is configured to further perform:
 generating print data based on the adjusted image data; and
 outputting the print data to a print executing device including a print head, the print head including a plurality of first nozzles and a plurality of second nozzles, the plurality of first nozzles being arranged in a sub-scanning direction and configured to eject first colorant corresponding to the first color component, the plurality of second nozzles being arranged in the sub-scanning direction and configured to eject second colorant corresponding to the second color component, the first direction corresponding to the sub-scanning direction, the first distance and the second distance being determined on a basis of a positional relationship in the sub-scanning direction between the plurality of first nozzles and the plurality of second nozzles.

4. The image processing apparatus according to claim 3, wherein the larger an offset in the sub-scanning direction between a center of gravity of the plurality of first nozzles and a center of gravity of the plurality of second nozzles is, the larger a difference between the first distance and the second distance is.

5. The image processing apparatus according to claim 3, wherein the first distance is identical to the second distance.

6. The image processing apparatus according to claim 5, wherein the plurality of first nozzles has a center of gravity whose position in the sub-scanning direction is identical to a position in the sub-scanning direction of a center of gravity of the plurality of second nozzles.

7. The image processing apparatus according to claim 3, wherein the first distance is different from the second distance.

8. The image processing apparatus according to claim 7, wherein the plurality of first nozzles has a center of gravity whose position in the sub-scanning direction is different from a position in the sub-scanning direction of a center of gravity of the plurality of second nozzles.

9. The image processing apparatus according to claim 1, wherein the gradation value of the first target pixel is determined on a basis of the gradation values of the first correspondence pixels by using weights for the first correspondence pixels, the weights for the first correspondence pixels being set on a basis of percentages of overlapped areas overlapped by the first target pixel of the first correspondence pixels when the first component image and the adjusted first component image are superimposed under the assumed conditions (a)-(d);
 wherein the gradation value of the second target pixel is determined on a basis of the gradation values of the second correspondence pixels by using weights for the second correspondence pixels, the weights for the second correspondence pixels being set on a basis of percentages of overlapped areas overlapped by the second target pixel of the second correspondence pixels when the second component image and the adjusted second component image are superimposed under the assumed conditions (e)-(h).

10. A non-transitory computer readable storage medium storing a set of program instructions executed by a computer, the program instructions comprising:
 acquiring image data representing an image and including first component image data and second component image data, the first component image data representing a first component image including a plurality of pixels each having a gradation value of a first color component, the second component image data representing a second component image including a plurality of pixels each having a gradation value of a second color component;
 adjusting the first component image data to generate adjusted first component image data, the adjusted first component image data representing an adjusted first component image including a plurality of pixels each having a gradation value of the first color component, a pixel count in a first direction of the adjusted first component image being determinative of a first resolution, the adjusted first component image data being generated by:
 selecting a first target pixel from the plurality of pixels in the adjusted first component image;
 acquiring gradation values of first correspondence pixels, the first correspondence pixels being at least two of the plurality of pixels in the first component image that are overlapped by the first target pixel when the first component image is shifted a first distance in the first direction relative to the adjusted first component image and superimposed in the adjusted first component image under assumed conditions (a)-(d):
 (a) a dimension of the first component image in the first direction is identical to a dimension of the adjusted first component image in the first direction;
 (b) a dimension of the first component image in the second direction is identical to a dimension of the adjusted first component image in the second direction;
 (c) the plurality of pixels in the first component image is arranged in a grid form, each pixel in the first component image having a first height in the first direction and a first width in the second direction, the first height being determined on a basis of a pixel count in the first direction of the first component image, the first width being determined on a basis of a pixel count in the second direction of the first component image; and
 (d) the plurality of pixels in the adjusted first component image is arranged in a grid form, each pixel in the adjusted first component image having a second height in the first direction and a second width in the second direction, the second height being determined on a basis of the pixel count in the first direction of the adjusted first component image, the second width being determined on a basis of a pixel count in the second direction of the adjusted first component image; and
 determining a gradation value of the first target pixel on a basis of gradation values of the first correspondence pixels;

adjusting the second component image data to generate adjusted second component image data, the adjusted second component image data representing an adjusted second component image including a plurality of pixels each having a gradation value of the second color component, a pixel count in the first direction of the adjusted second component image being determinative of a second resolution lower than the first resolution, the adjusted second component image data being generated by:

selecting a second target pixel from the plurality of pixels in the adjusted second component image;

acquiring gradation values of second correspondence pixels, the second correspondence pixels being at least two of the plurality of pixels in the second component image that are overlapped by the second target pixel when the second component image is shifted a second distance in the first direction relative to the adjusted second component image and superimposed in the adjusted second component image under assumed conditions (e)-(h):

(e) a dimension of the second component image in the first direction is identical to a dimension of the adjusted second component image in the first direction;

(f) a dimension of the second component image in the second direction is identical to a dimension of the adjusted second component image in the second direction;

(g) the plurality of pixels in the second component image is arranged in a grid form, each pixel in the second component image having a third height in the first direction and a third width in the second direction, the third height being determined on a basis of a pixel count in the first direction of the second component image, the third width being determined on a basis of a pixel count in the second direction of the second component image; and (h) the plurality of pixels in the adjusted second component image is arranged in a grid form, each pixel in the adjusted second component image having a fourth height in the first direction and a fourth width in the second direction, the fourth height being determined on a basis of the pixel count in the first direction of the adjusted second component image, the fourth width being determined on a basis of a pixel count in the second direction of the adjusted second component image; and determining a gradation value of the second target pixel on a basis of gradation values of the second correspondence pixels; and generating adjusted image data based on the adjusted first component image data and adjusted second component image data.

* * * * *